(12) United States Patent
Alfaro

(10) Patent No.: US 7,566,089 B2
(45) Date of Patent: Jul. 28, 2009

(54) AUTOMOTIVE FUEL DOOR ASSEMBLY

(75) Inventor: Erick E. Alfaro, Ajax (CA)

(73) Assignee: Van-Rob Inc., Aurora, Ontario (CA)

( * ) Notice: Subject to any disclaimer, the term of this patent is extended or adjusted under 35 U.S.C. 154(b) by 422 days.

(21) Appl. No.: 11/504,113

(22) Filed: Aug. 15, 2006

(65) Prior Publication Data

US 2007/0040409 A1    Feb. 22, 2007

(30) Foreign Application Priority Data

Aug. 17, 2005    (CA)    .................... 2516139

(51) Int. Cl.
B60K 15/05    (2006.01)
(52) U.S. Cl. .................... 296/97.22; 280/853
(58) Field of Classification Search ............. 296/97.22; 220/DIG. 33; 280/834, 853
See application file for complete search history.

(56) References Cited

U.S. PATENT DOCUMENTS

| | | | |
|---|---|---|---|
| 1,938,375 A | 12/1933 | Coffee | |
| 3,182,988 A | 5/1965 | Woodall | |
| 3,301,732 A | 1/1967 | Kunz | |
| 3,895,506 A | 7/1975 | Gallego | |
| 3,905,637 A | 9/1975 | Smith | |
| 4,236,746 A | 12/1980 | LaVoie | |
| 4,475,726 A | 10/1984 | Smith | |
| 4,527,825 A * | 7/1985 | Clouse | 296/97.22 |
| 4,537,437 A | 8/1985 | Buccola | |
| 4,782,978 A | 11/1988 | Appleby et al. | |
| 4,811,984 A | 3/1989 | Hempel | |
| 4,971,382 A | 11/1990 | Ohno | |
| 5,044,678 A | 9/1991 | Detweiler | |
| 5,076,622 A | 12/1991 | Detweiler | |
| 5,165,749 A | 11/1992 | Sheppard | |
| 5,437,491 A | 8/1995 | Nedbal et al. | |
| 5,462,190 A | 10/1995 | Lienhart et al. | |
| 5,658,036 A | 8/1997 | Benoist | |
| 5,664,811 A | 9/1997 | Martus et al. | |
| 5,769,481 A | 6/1998 | Cooper | |
| 5,836,638 A | 11/1998 | Slocum | |
| 5,884,958 A * | 3/1999 | Oddenino | 296/97.22 |
| 5,924,757 A | 7/1999 | Stapf | |
| 5,944,218 A | 8/1999 | Jenssen | |
| 5,954,387 A | 9/1999 | Fisher | |
| 6,106,049 A | 8/2000 | Cole et al. | |
| 6,189,959 B1 | 2/2001 | VanAssche et al. | |
| 6,352,295 B1 | 3/2002 | Leitner | |
| 6,508,501 B1 | 1/2003 | Meinke | |
| 6,539,990 B1 | 4/2003 | Levey et al. | |

(Continued)

FOREIGN PATENT DOCUMENTS

CA    2414208    6/2004

(Continued)

*Primary Examiner*—Jason S Morrow
(74) *Attorney, Agent, or Firm*—Riches, McKenzie & Herbert LLP

(57) ABSTRACT

A construction for a fuel door assembly in which one or more different spring members may be coupled to the same assembly to provide for different operational characteristics. A novel construction for a fuel door assembly in which a spring member is provided and incorporated as part of the assembly securing engaging the other components assembly to prevent vibration and rattling.

20 Claims, 21 Drawing Sheets

U.S. PATENT DOCUMENTS

| | | | |
|---|---|---|---|
| 6,752,448 B1 * | 6/2004 | Hsu | 296/97.22 |
| 2002/0021017 A1 * | 2/2002 | Foltz | 296/97.22 |
| 2002/0130531 A1 | 9/2002 | Leitner | |
| 2005/0280276 A1 * | 12/2005 | McComsey | 296/97.22 |
| 2008/0136210 A1 * | 6/2008 | Scott et al. | 296/97.22 |

FOREIGN PATENT DOCUMENTS

DE 37 06 080 11/1987

\* cited by examiner

FIG. 10.
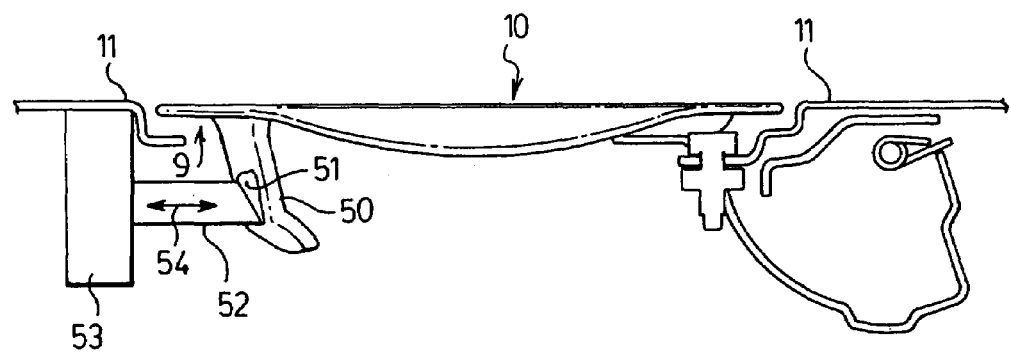
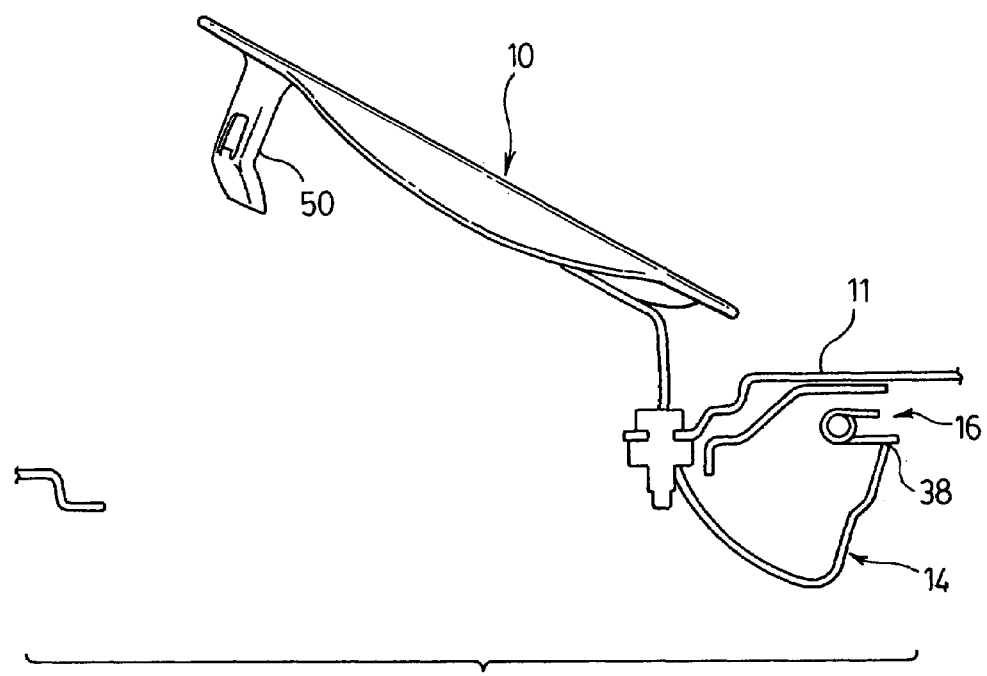
FIG. 11.

AUTOMOTIVE FUEL DOOR ASSEMBLY

SCOPE OF THIS INVENTION

This invention relates to an assembly for an automobile fuel door and, more particularly, to a fuel door assembly which is adapted for use with a plurality of spring members including a spring member which biases the door to open on unlatching via a remote unlatching mechanism.

BACKGROUND OF THE INVENTION

Automobiles such as cars and trucks have a fuel system for storage of fuels, typically gasoline which is consumed to power the vehicle. A fuel door is a door which provides a cosmetic covering to the fuel containment system. Typically, the fuel door is to be opened to provide access to a gas cap which is removable for access to a pipe leading to a gas tank and through which gasoline or other fuels may be added. The fuel door often not only provides a cosmetic covering, and may be locked so as to provide protection against unauthorized access to the fuel cap.

Manual fuel door assemblies are known which are adapted for opening manually as, for example, by a finger pull-tab being provided on the fuel door to be engaged by a user to move the fuel door between the open and closed position. Manual fuel door assemblies are also known which provide spring mechanisms to firstly, bias the fuel door to a closed position and secondly, on movement from the closed position towards the open position to bias the fuel door to the open position.

Fuel door assemblies are known which provide mechanisms for remote opening typically by providing a latch mechanism which holds the fuel door in a closed position. The latch may be unlatched from a remote location to release the fuel door. On unlatching of the latch, the fuel door may then be opened, for example, manually or more preferably under the bias of an initial pop-up spring which moves the fuel door from a closed position to either a partially open position from which it may be manually moved to a fully opened position, or to a fully open position.

Fuel door assemblies typically include a door side hinge bracket and a body side hinge bracket which are coupled together for pivoting to move the door side hinge bracket carrying a fuel door between the closed and the opened position. The present inventors have appreciated that most vehicle manufacturers use different configurations of door side hinge brackets and body side hinge brackets dependent upon the desired operational characteristics of the fuel door assembly, such as whether they may be manually opened, remotely opened and/or have springs with provide for pop-up and full or partial opening. This has a disadvantage of requiring increased parts for manufacture and increased overall costs.

BACKGROUND OF THE INVENTION

To at least partially overcome these disadvantages of known fuel door devices, the present invention provides a construction for a fuel door assembly in which one or more different spring members may be coupled to the same assembly to provide for different operational characteristics.

To at least partially overcome other disadvantages of known fuel door devices the present invention provide a novel construction for a fuel door assembly in which a spring member is provided and incorporated as part of the assembly securing engaging the other components assembly to prevent vibration and rattling.

An object of the present invention is to provide an improved fuel door assembly.

Another object is to provide a fuel door assembly that allows the interchangeable springs for remotely opening doors and manually opening doors using the same door side and body side hinge brackets.

In one aspect the present invention provides an automotive fuel door assembly comprising:

a door side hinge bracket having a bight portion and a pair of spaced parallel side flanges each having a journalling opening therethrough, a body side hinge bracket having a bight portion and a pair of spaced parallel side flanges each having a journalling opening therethrough, an elongate axle member extending through the journalling openings of the door side hinge bracket member and the journalling openings of the body side hinge bracket member to couple the door side hinge bracket and the body side hinge bracket together for relative pivoting about the axle member with the side flanges of one, interior of the door side hinge bracket and the body side hinge bracket being disposed along the axle member in between the side flanges of the other, exterior of the door side hinge bracket and the body side hinge bracket, a first spring member for biasing the door side hinge bracket relative the body side hinge bracket to pivot about the axle member from a closed position toward an open position, the first spring member comprising a strand of resilient wire, the first spring member having a pair of helical coils coaxially about the axle member axially spaced from each other by a central tab loop of the wire extending radially from the axle member at an interior end of each coil for engagement with the bight of a first of the door side hinge bracket and body side hinge bracket, the first spring member having a pair of catch arms each extending radially from the exterior end of each of the coils into engagement with a second of the door side hinge bracket and body side hinge bracket, the first spring member fixed on the axle member against axial sliding by being compressed or expanded axially on the axle member by engagement of the catch arms with the second of the door side hinge bracket and the body side hinge bracket, the first spring member fixedly coupled by each catch arms with the second of the door side hinge bracket and body side hinge bracket against pivoting movement of the first spring member about the axle member relative the second of the door side hinge bracket and body side hinge bracket, the tab loop engaging the bight portion of the first of the door side hinge bracket and body side hinge bracket when the door side hinge bracket and body side hinge bracket are the closed position and in relative pivotal positions from the closed position toward the open position.

BRIEF DESCRIPTION OF THE DRAWINGS

Further aspects and advantages of the present invention will occur from the following description taken together with the accompanying drawings in which:

FIG. 10 is a schematic cross-sectional side view along section line 10-10' in FIG. 2 showing the fuel door assembly of FIG. 2 in a closed position;

FIG. 11 is the same view as in FIG. 10, however, showing the door in an intermediate open position 30° from the closed position;

DETAILED DESCRIPTION OF THE DRAWINGS

Figure 1:
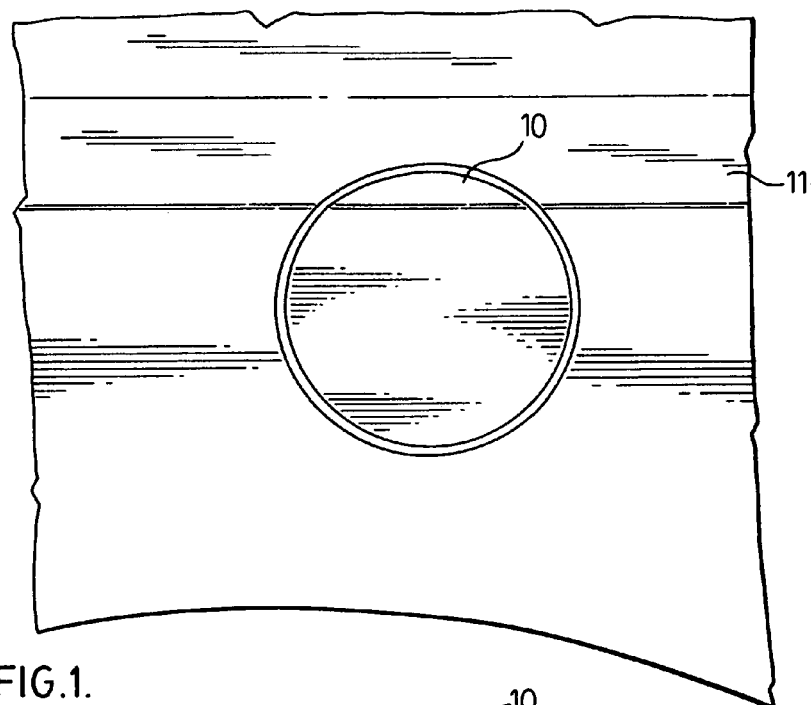
FIG. 1 is an external view of a fuel door in accordance with a first embodiment of the present invention in a closed position relative to a body of a vehicle.
Figure 2:
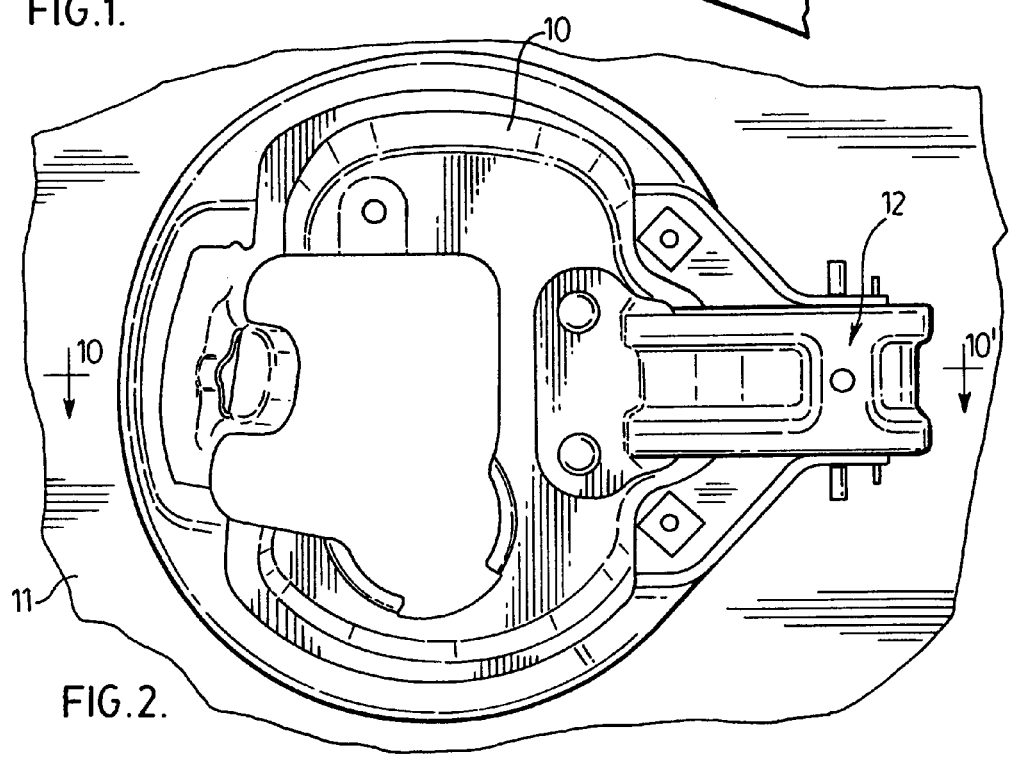
FIG. 2 is an internal view of the fuel door of FIG. 1 in the closed position.
Figure 12:
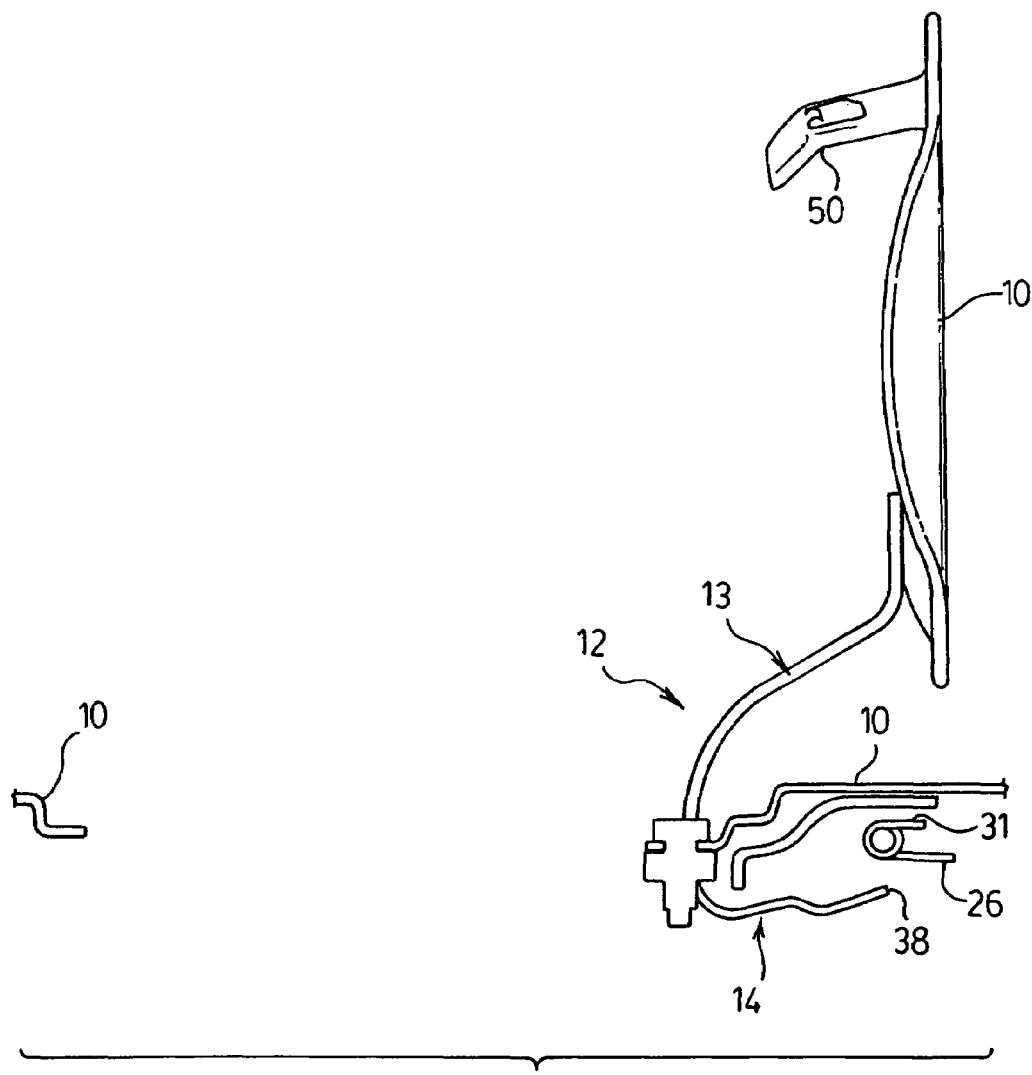
FIG. 12 is the same view as shown in FIG. 10, however, showing the door in a fully open position 90° from a closed position.
Figure 13:
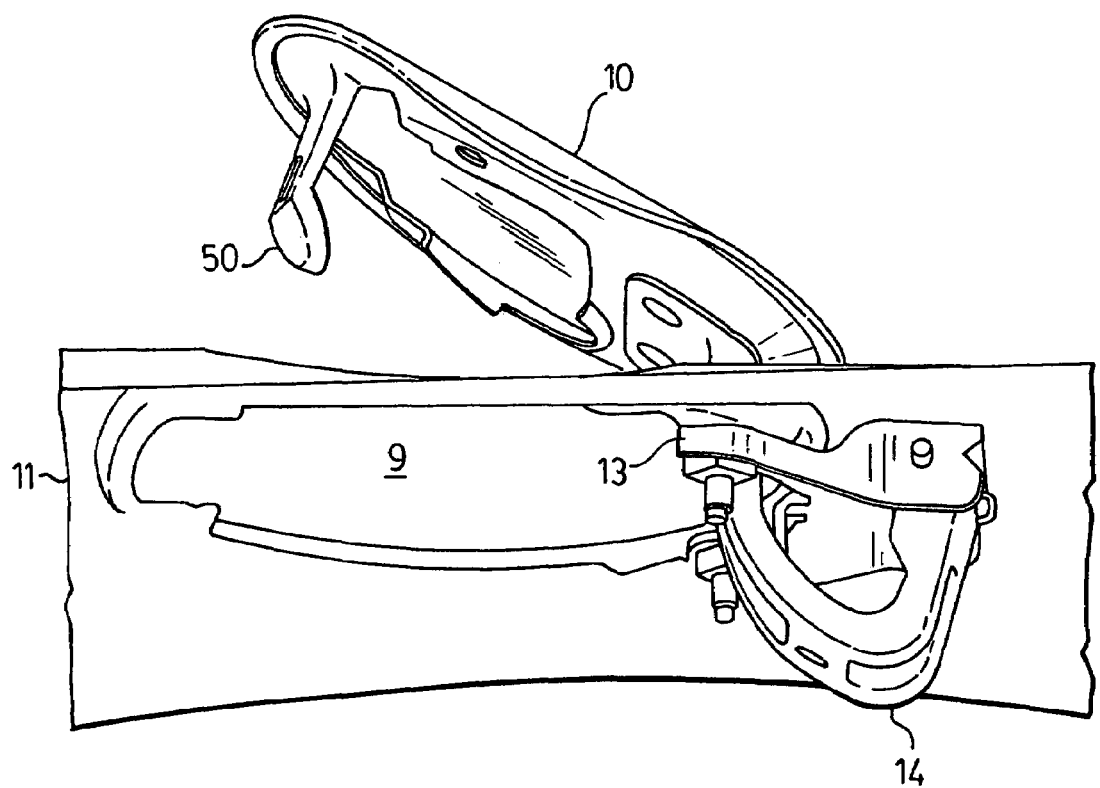
FIG. 13 is a schematic pictorial view showing the fuel door assembly of FIG. 3 in the position of FIG. 11.

Reference is made to FIGS. 1 to 13 which illustrate a first embodiment of an automotive fuel door assembly in accordance with the present invention adapted for remote release of the fuel door from a closed position illustrated in FIGS. 1, 2 and 10 initially to an intermediate open position as illustrated in FIGS. 11 and 13 30° from the closed position.

FIG. 1 illustrates an external view of a fuel door 10 in a closed position and disposed to be substantially flush with a surrounding body 11 of a vehicle.

FIG. 2 illustrates an internal view of the fuel door assembly of FIG. 1 showing the door 10 coupled via a fuel door hinge assembly 12 to the body 11.

Figure 3:
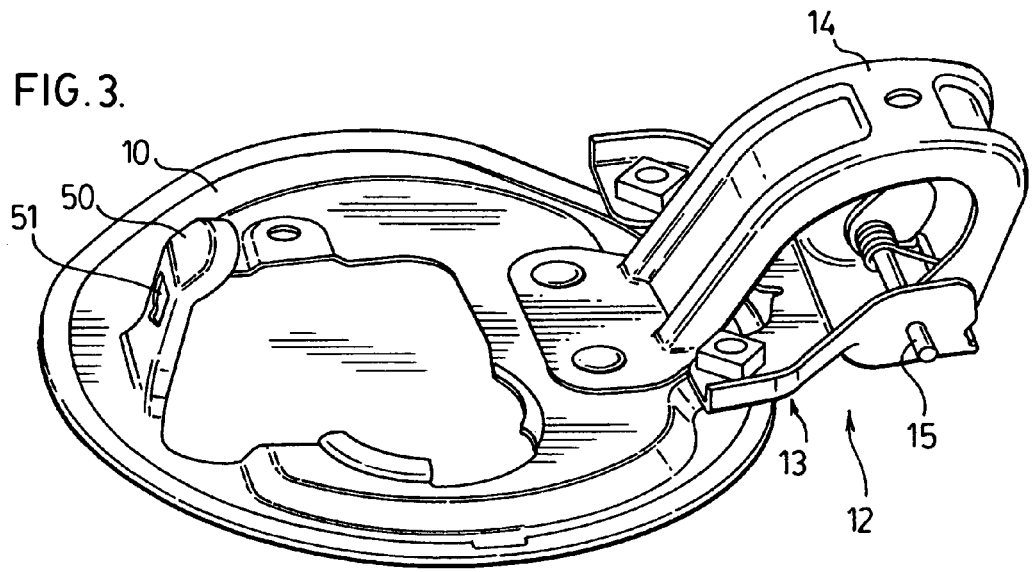
FIG. 3 is pictorial rear-view of the fuel door assembly of FIG. 2 including the filler door and a fuel door hinge assembly.

FIG. 3 is a pictorial view of the door 10 and attached hinge assembly 12 shown in FIG. 2. The components of the hinge assembly 12 are illustrated in the exploded view of FIG. 4 as comprising a body side hinge bracket 13, a door side hinge bracket 14, an axle member 15 and a coil spring member 16.

Figure 5:
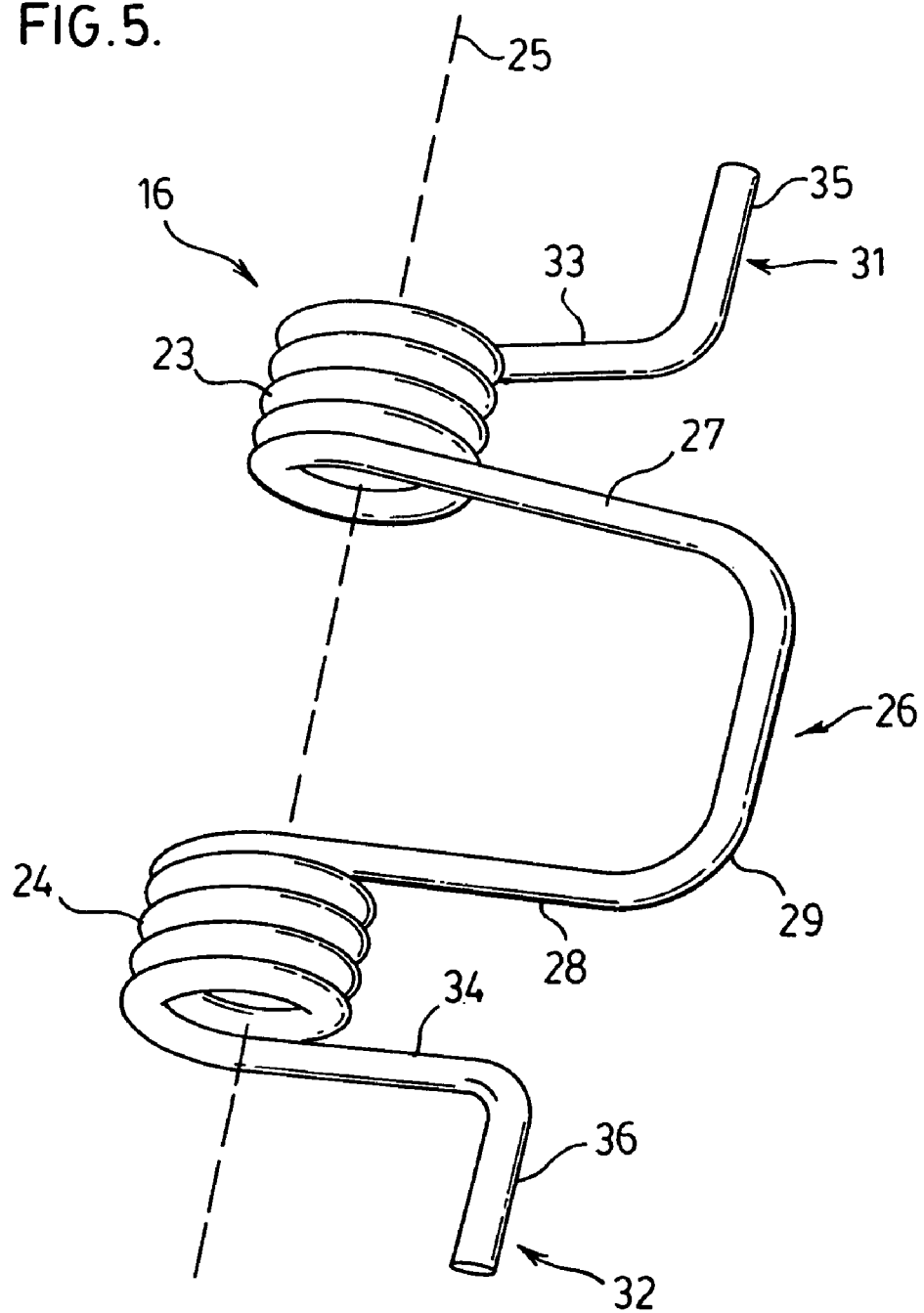
FIG. 5 is an enlarged pictorial view of the spring shown in FIG. 4.
Figure 6:
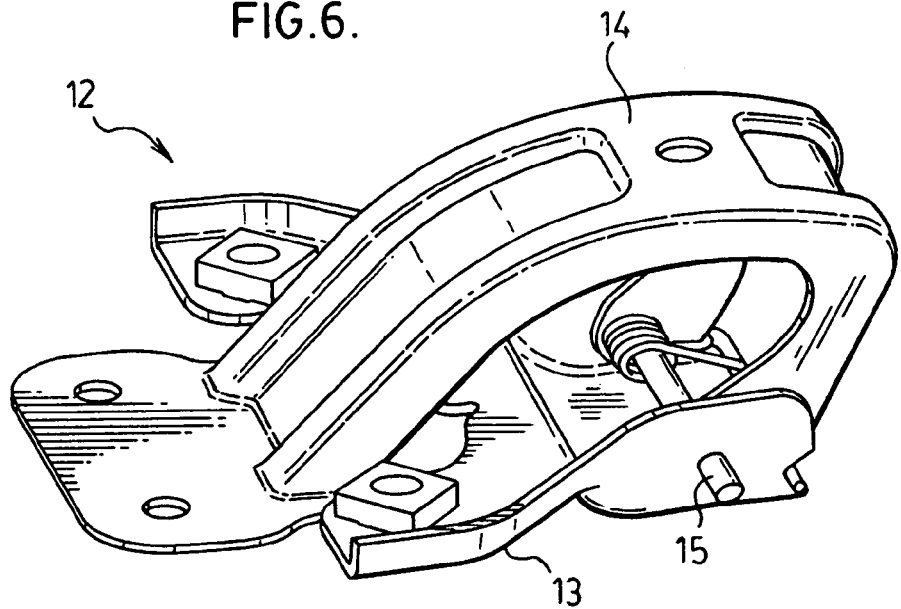
FIG. 6 is an enlarged perspective view of the fuel door hinge assembly shown in FIG. 3 in a closed position.

The coil spring member 16 comprises a strand of resilient wire. As best seen in FIG. 5, the wire is bent to adopt a shape having a pair of helical coils 23 and 24 coaxial about an axis indicated as 25. Each coil 23 and 24 is sized to fit coaxially about the axle member 15. Each of the coils 23 and 24 are axially spaced from each other by a central tab loop 26 having side portions 27 and 28 extending radially from each of the coils 23 and 24 and joined by a tab bight 29. At the outer ends of each of the coils 23 and 24, respective catch arms 31 and 32 extend radially each being formed as a generally L-shape member with radially extending side portions 33 and 34 and axially extending end portions 35 and 36.

Figure 4:
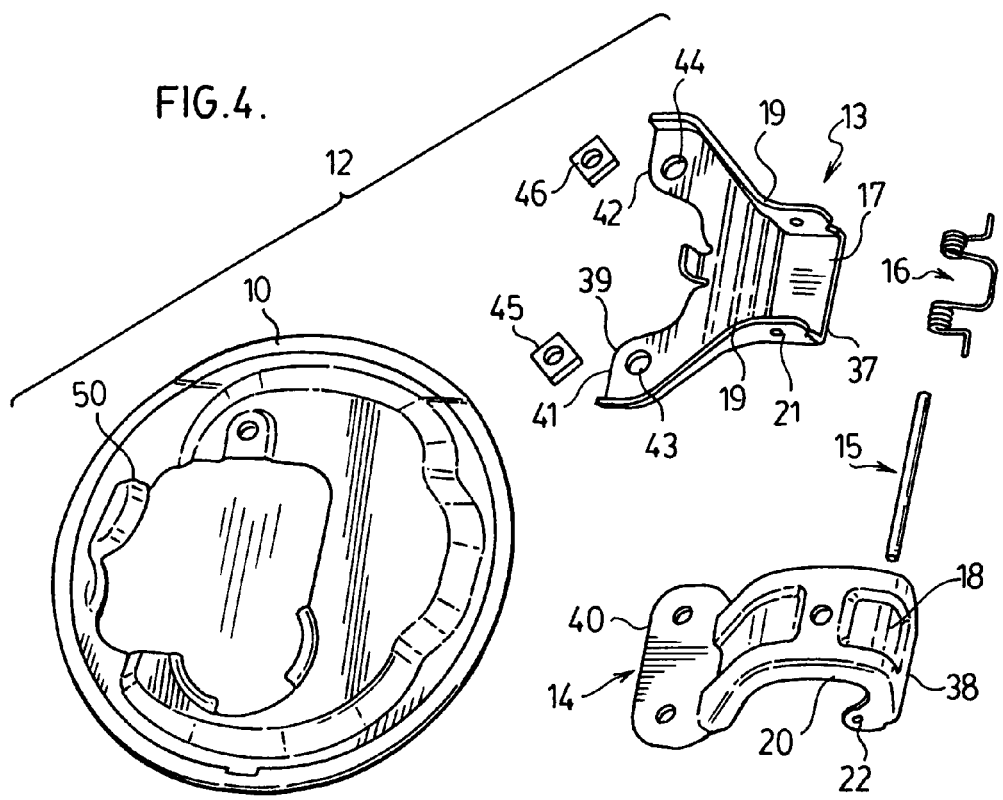
FIG. 4 is a schematic exploded view of the fuel door assembly of FIG. 3.
Figure 9:
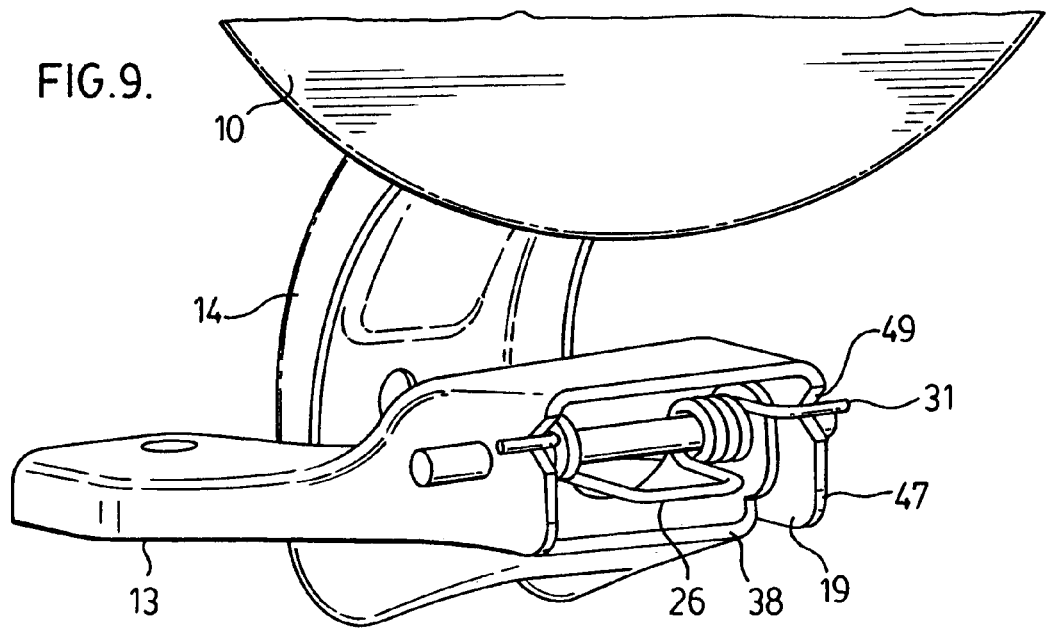
FIG. 9 is an alternative perspective view of the fuel door hinge assembly of FIG. 8 showing a portion of the door as attached.

As best seen in FIG. 4, the body side hinge bracket 13 has a bight portion 17 and side flanges 19, each having a journalling opening 21 therethrough to receive the axle member 15. The body side hinge bracket 13 has a hinge end 37 approximate the axle member 15 and a distal end 39. The distal end 39 shown as being bifocated into two arms 41 and 42, each carrying an opening 43 and 44 to which nuts 45 and 46 are secured as by welding such that the distal end 39 of the body side bracket 13 may be secured as by bolts to the body 11 of the automobile adjacent an opening 9 through the body 11 as seen in FIG. 10. The side flanges 19 of the body side hinge bracket 13 are parallel to each other approximate the hinge end 37 over an extent including the opening 21. As best seen in FIG. 9, each of the side flanges 19 have an end surface 47 and a channel 49 which extends inwardly of the end surface and laterally. Each of the channels 48 is adapted to receive a respective one of the catch arms 31 and 32 of the spring member 16 towards securing the catch arms 31 and 32 to the body side hinge bracket 13 against relative movement.

Referring to FIG. 4, the door side hinge bracket 14 has a bight portion 18, parallel side flanges 20, with each side flange 20 having an opening 22 to receive the axle member 15. The door side hinge bracket 14 has its side flanges 20 extend parallel to each other substantially over the entirety of the door side hinge bracket.

The door side hinge bracket 14 has a hinge end 38 approximate the axle member 15 and a distal end 40. The distal end 40 is adapted to be secured to the door 10 preferably by spot welding. The door side hinge bracket 14 has a "goose-neck" configuration as will be described later. The door side hinge bracket 14 has at its hinge end 38 of the bight portion 18, a hinge end surface for engagement by the tab loop 26 of the spring member 16.

Figure 7:
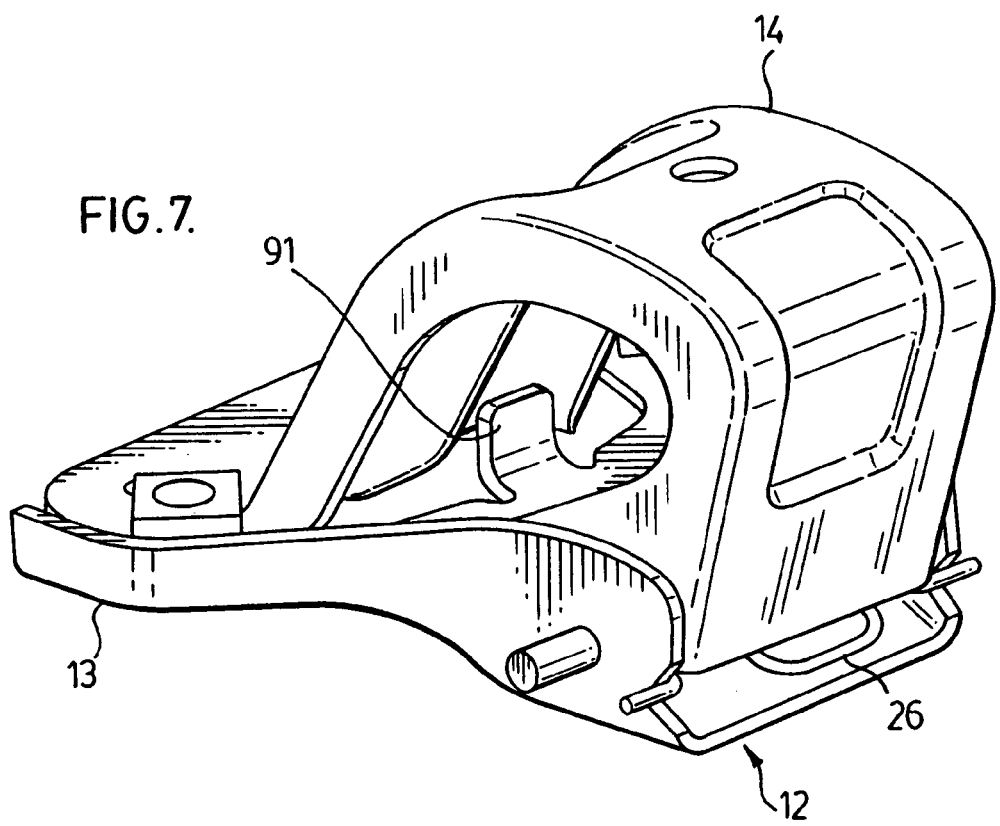
FIG. 7 is an alternative perspective view of the fuel door hinge assembly shown in FIG. 6 in a closed position.
Figure 8:
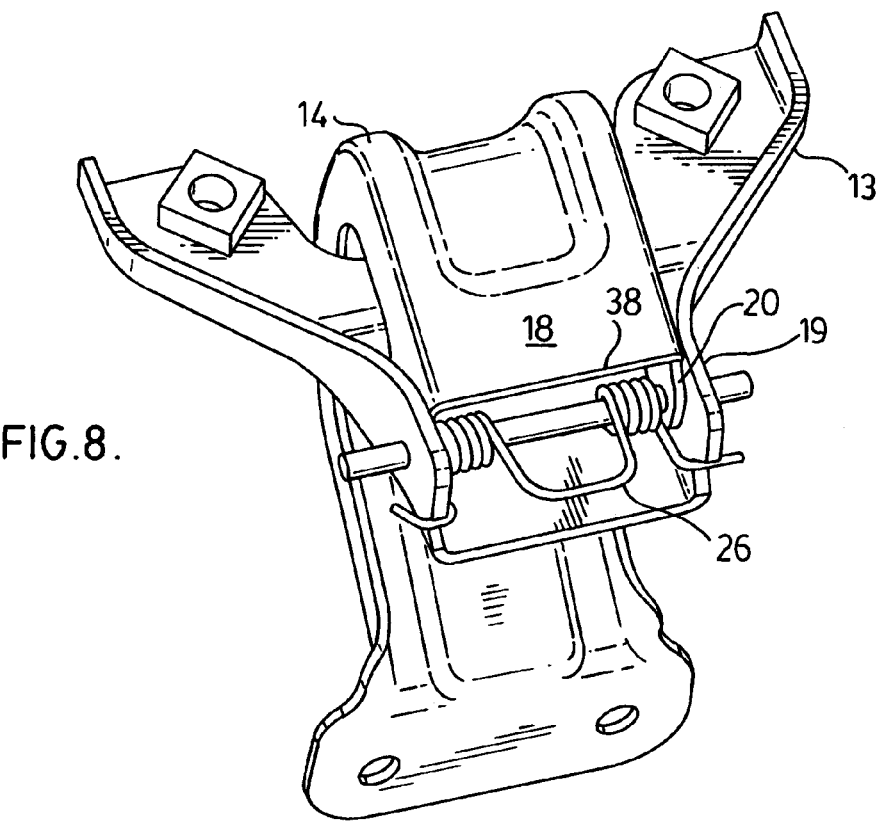
FIG. 8 is a perspective view of the fuel door hinge assembly shown in FIG. 6 in an open position.

The hinge assembly 12 is shown assembled in FIGS. 7 to 9. As seen, each of the body side hinge bracket 13, door side hinge bracket 14 and spring member 16 are nested together and held coupled by the axle member 15. In this regard, the side flanges 19 of the body side hinge bracket 13 are disposed laterally outside of the side flanges 20 of the door side hinge bracket 14. The spring member 16 has its coils 23 and 24 disposed laterally inside of the side flanges 20 of the door side hinge bracket 14. The axle member 15 passes successively through the coaxial aligned openings 22, openings 21 and the coils 23 and 24. The axle member 15 thus couples the body side hinge bracket 13 to the door side hinge bracket 14 for relative pivoting about the axle member 15.

The catch arms 31 and 32 of the spring member 16 are fixably secured to the body side bracket 13 by being fixedly engaged to the side flanges 19 of the body side bracket member 13. In this regard, the end portions 35 and 36 of the catch arms 31 and 32 are received within the channels 49 in the end surfaces 47 of each of the side flanges 19 of the body side hinge bracket 13. As illustrated in FIG. 9, preferably each of the end portions 35 and 36 are on assembly positioned within the channels 48 and subsequently after assembly may be crimped such that the end portions 35 and 36 may be bent to extend along the outer side of the flanges 19.

The coil spring member 16 is configured such that in an assembled hinge assembly 12 as for example illustrated in FIG. 8, the coil spring member 16 is axially compressed so as to maintain the coil spring member 16 in a fixed position axially relative to the body side hinge bracket 13. In this regard, in the assembled hinge assembly 12 shown in FIG. 8, the side portions 33 and 34 engage the inside surfaces of the side flanges 19 of the body side hinge bracket 13 so as to compress the coil spring member 16 axially as for example by deflection of the catch arm 31 and/or the helical coils 23 and 24 and/or the central tab loop 26.

The coil spring member 16 is thus securely fixed to the hinge assembly 12 against movement which would cause rattling or noise or dislocation. This can be assisted provided amongst other things by the helical coils 23 and 24 fittings snugly, preferably in a loose friction fit, about the axle member 15, by the spring 16 being tensioned and/or compressed axially and by the spring 16 being fixedly secured against rotation on the axle member 15 by the catch arms 31 and 32 engaging with the body side hinge bracket 13. Other arrangements and configurations may occur to a person skilled in the art. For example, the spring member 16 could be provided to be tensioned axially by stretching axially as for example via the catch arms 31 and 32 being drawn apart for engagement on the side flanges 19.

Reference is made to FIG. 12 which illustrates a cross-sectional side view through FIG. 2 along section line 10-10' but with the door in a fully open position 90° from the closed position of FIG. 10. In FIG. 12, the spring member 16 is not torsionally compressed or tensioned about the axle member 15 but rather is in an unbiased condition. The catch arms 31 and 32 of the spring member 16 are fixedly secured to the body side bracket by being fixedly engaged to the side flanges 19 of the body side bracket member 13. The tab loop 26 is shown to extend generally parallel to the catch arms 31 and 32 and is spaced from and does not engage the hinge end 38 of door side hinge bracket member 14. This same fully open position of the hinge assembly 12 of FIG. 12 is illustrated in FIGS. 8 and 9. FIG. 9 particularly shows the tab loop 26 as being spaced from and not engaging the hinge end 38 of the bight portion 18 of the door side hinge bracket 14. From the 90° open position shown in FIG. 12, the door may be rotated counter-clockwise without tortionally tensioning the spring member 16 until the door reaches the intermediate, 30° open position illustrated in FIG. 11 when the hinge end surface 38 of the bight portion 18 of the door side hinge bracket 14 engages the tab loop 26 of the spring member 16. With subsequent rotating of the door 10 and its door side hinge bracket 14 to the fully closed position illustrated in FIG. 10, the spring member 16 is tortionally compressed with the tab loop 26 being deflected counter-clockwise as shown towards the catch arm 31 which remain a fixed position.

As may be seen for example in each of FIGS. 3 and 10 to 12, the door 10 includes an inwardly extending latch foot 50 carrying a latch socket 51 which is adapted to a couple with a removable latch member 52, shown only in FIG. 10, carried on a latch support 53 secured to the body 11 on the opposite side of the body opening 9 from which the body side hinge bracket 13 is secured. The latch member 52 is adapted to be moved laterally as indicated by the arrow 54 to disengage from the socket 51. While not shown, a mechanism is provided as for remote operation of the latch member 52. On the door 10 moving from the open positions of FIGS. 12 and 11 to the closed position of FIG. 10, the latch member 52 comes to engage in the socket 51 and latch the door 10 in the closed position of FIG. 10. On release of the latch member 52, the bias of the spring member 16 moves the door side hinge bracket 14 and the door 10 from the closed position illustrated in FIG. 10 to the intermediate position of FIG. 11. From the intermediate position of FIG. 11, the door 10 may be moved manually to the fully opened position shown in FIG. 12. Preferably, resistance to movement of the door side hinge bracket 14 between the positions of FIGS. 11 and 12 is provided by reason of friction between the various components and preferably by reason of friction between the inner surfaces of the side flanges 19 of the body side hinge bracket 13 and the outside surfaces of the side flanges 20 of the door side hinge bracket 14.

FIG. 13 illustrates a schematic pictorial view the intermediate 30° open position of the hinge assembly illustrated in FIG. 11.

Reference is now made to FIGS. 14 to 18 which illustrate a second embodiment of the invention. The second embodiment is the same as the first embodiment, however, the hinge assembly 12 is also adapted for use with a leaf spring member 60 best illustrated in the exploded views of FIGS. 15 and 16 as having an omega shape in side view with smaller curved end hook members 61 and 62 at each end between a central large curved main spring portion 63. The door side hinge bracket 14 has been modified to provide a central laterally extending elongate first slotway 66 spaced from the hinge end 38 to define between the slotway 66 and the hinge end 38 and an elongate first bridge member 68. The slotway 66 has a first slot end wall 70 internally of the slotway 66 on the side of the slotway 66 opposite from the first bridge member 68. The door side hinge bracket 14 is also shown as slightly modified such that the hinge end surface 38 of the bight portion 18 includes a central slot 72 adapted to be engaged by the tab loop 26 when a coil spring member 16 is included.

The body side hinge bracket 13 of the second embodiment is modified over that of the first embodiment in that the bight portion 17 includes a central bight tab 69 upstanding from the bight portion 17 between the side flanges 19 and extending from the bight portion 17 in the same direction as the side flanges 19. The bight tab 69 has spaced lateral side walls 71 and 73 and a second end wall 75 bridging between the side walls 71 and 73. A central laterally extending elongate second slotway 77 is provided approximate the end wall 75 defining between the slotway 77 and the end wall 75 an elongate second bridge member 79. The second bridge member 79 is adapted to engage the second hook member 62 of the leaf spring 60.

Figure 14:
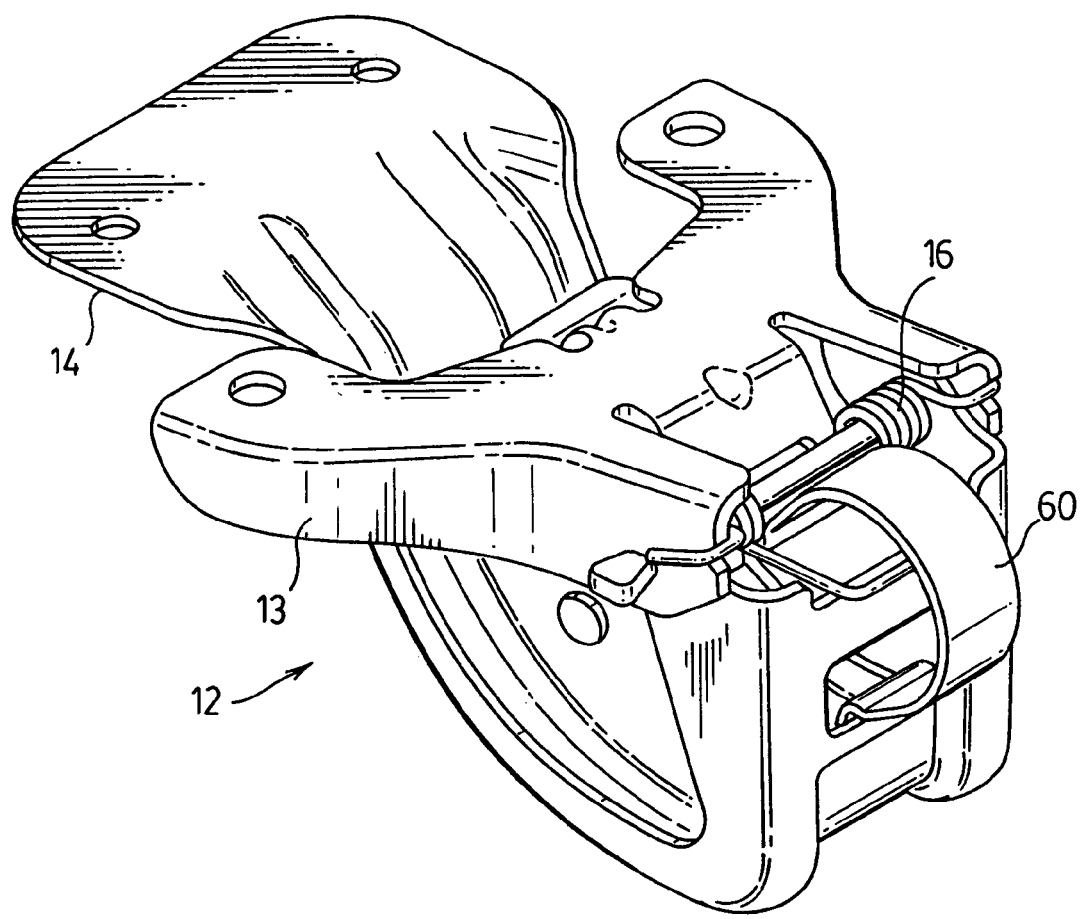
FIG. 14 is a pictorial view of a fuel door hinge assembly in accordance with a second embodiment of the present invention in a closed position.

The hinge assembly 12 as illustrated in FIG. 14 incorporates both the coil spring member 16 and the leaf spring member 60. The coil spring member 60 is coupled to the hinge assembly 12 in an identical matter to that illustrated in FIGS. 1 to 13 as is advantageous for remote opening. The leaf spring member 60 is, under all conditions of the body side hinge bracket 13 and the door side hinge bracket 14, biased such that its hook members 61 and 62 remain engaged on the bridge members 68 and 79. The leaf spring member 60 is configured such that in the closed position as illustrated in FIG. 14, the leaf spring member 60 biases the door side hinge bracket 14 to a closed position relative to the body side hinge bracket 13. However, when the hinge assembly 12 is in a fully opened position, the leaf spring member 60 biases the door side hinge bracket 14 toward the open position relative to the body side hinge bracket 13. At a medial position in between the closed position and the open position, the leaf spring member 60 does not bias the door side hinge bracket 13 to pivot towards either the open or the closed position relative to the body side hinge bracket 14 and thus such a mediate position is a neutral position. When on the closed side of such neutral medial position, the door side hinge bracket 14 will be biased by the leaf spring member 60 to the closed position, and when on the open side of such neutral medial position, the door side hinge bracket 14 will be biased by the leaf spring member 60 to the open position.

If the embodiment illustrated in FIG. 14 is to be used with a remote open latch as with the first embodiment, the coil spring member 16 will provide a force in the closed position which biases the door side hinge bracket 13 towards the open position greater than a force by which the leaf spring member 60 urging the door side hinge bracket 13 to the closed position.

Figure 17:
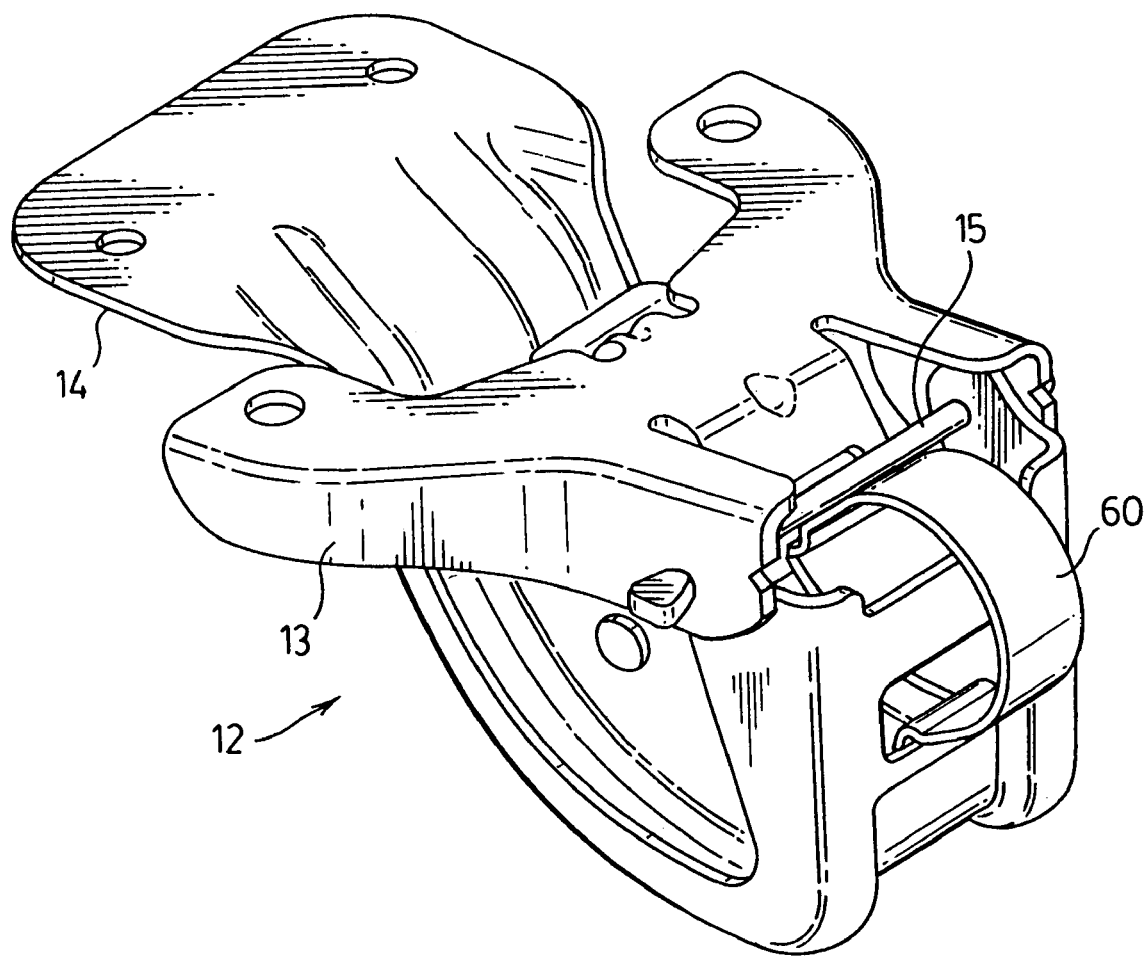
FIG. 17 is a perspective view the same as in FIG. 14, showing the same embodiment but merely with a leaf spring.

Reference is made to FIG. 17 which illustrate the second embodiment of FIG. 14, however, in a configuration in which merely the leaf spring member 60 is provided and the coil spring member 16 is not provided. Such a configuration can be advantageous for use with a fuel door which is to be manually opened as for example by having a finger tab to overcome the bias of the leaf spring member 60 against initial opening.

Figure 18:
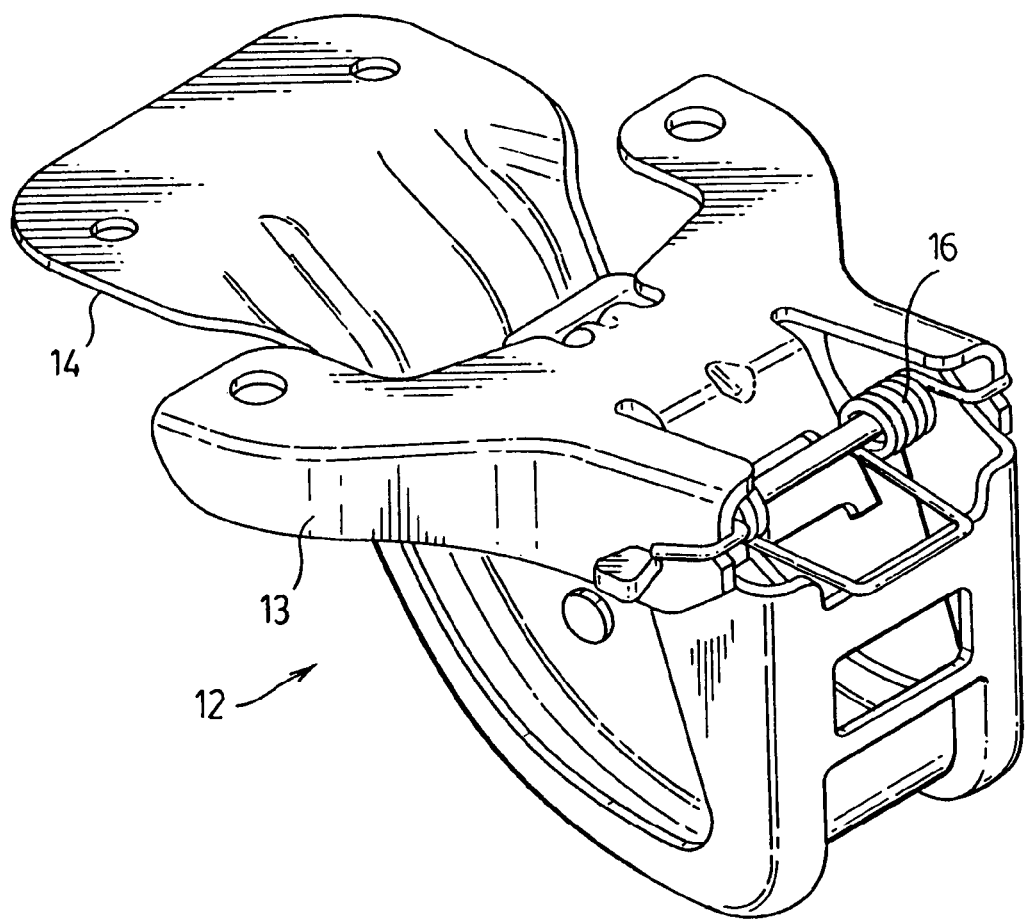
FIG. 18 is a perspective view the same as that shown in FIG. 14, showing the same embodiment but merely with a coil spring.

FIG. 18 illustrates a further configuration of the second embodiment of FIG. 14, however, in a configuration in which merely the coil spring member 16 is provided and the leaf spring member 60 is not provided. Such a configuration may function substantially identical to that illustrated with the first embodiment of FIGS. 1 to 13.

Figure 15:
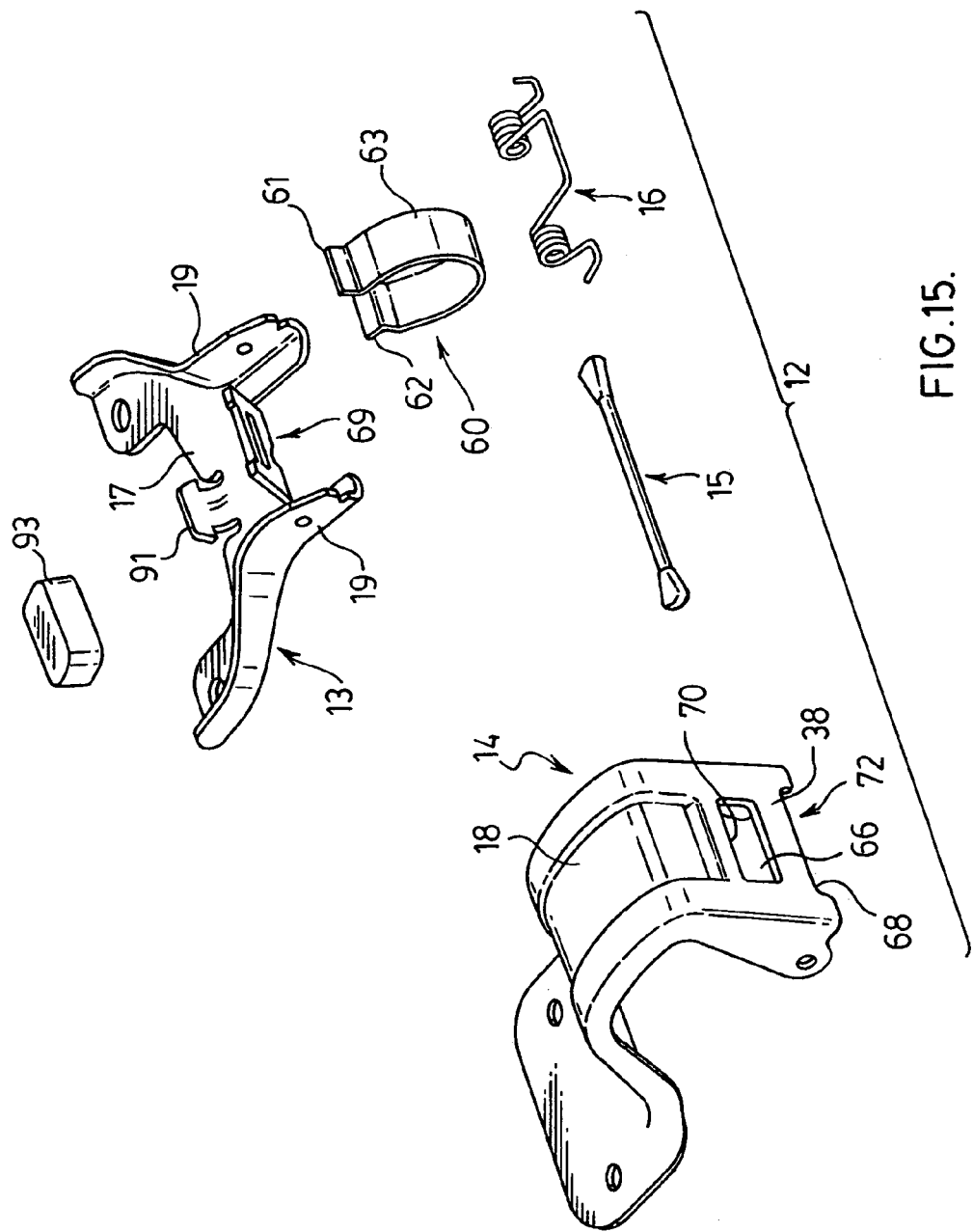
FIG. 15 is a first exploded perspective view of the fuel door hinge assembly of FIG. 14.
Figure 16:
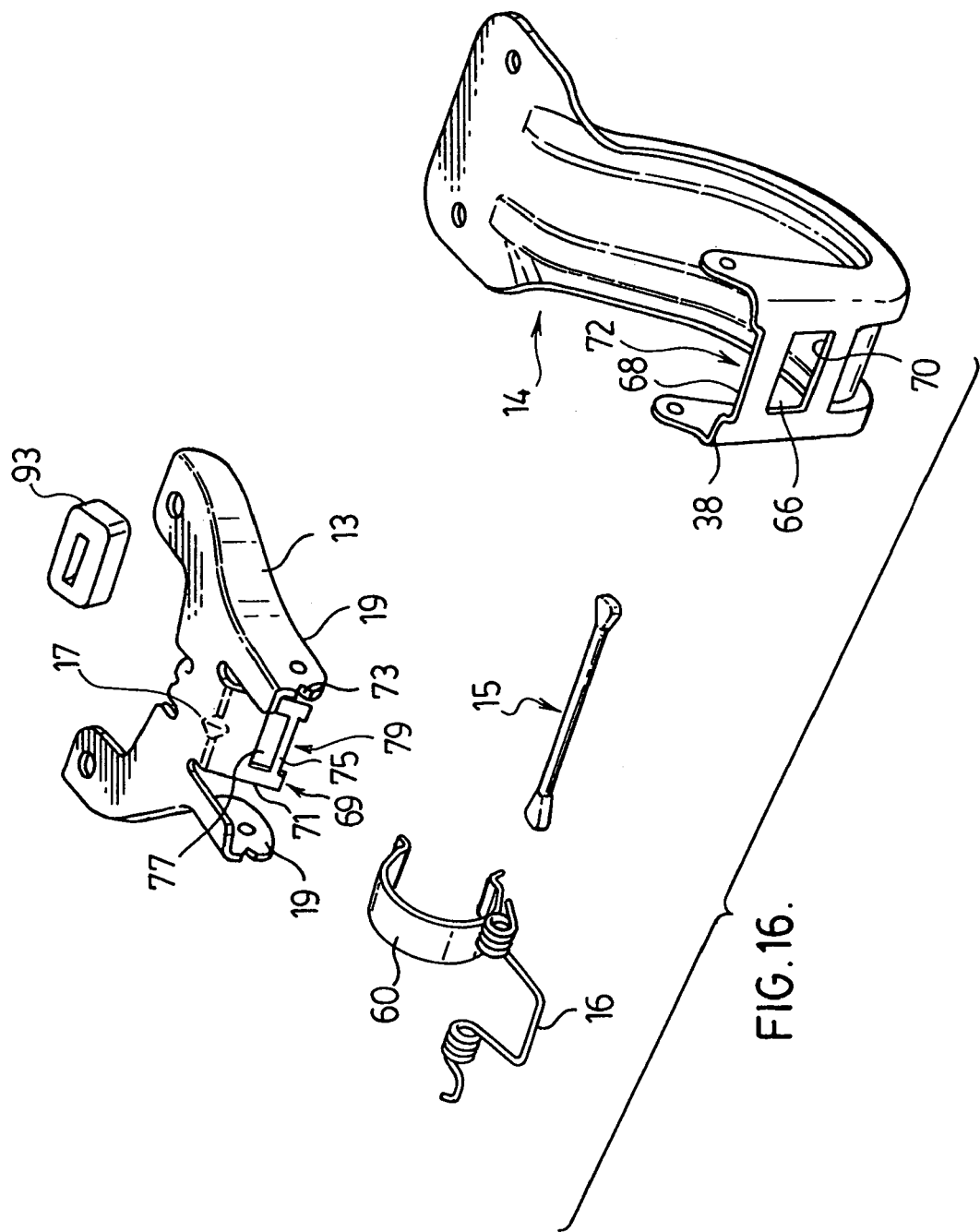
FIG. 16 is a second exploded perspective view of the fuel door hinge assembly of FIG. 14.

A door stop 91 is shown carried on the bight 17 of the body side bracket member 12 as best seen in FIGS. 15 and 16 upon which a plastic or elastomeric stop bumper 93 is to be received for engagement with the bight portion 18 of the door side bracket member 14 to stop rotation of the bracket members in the closed position.

Reference is made to FIGS. 19 to 27 which illustrate a fourth embodiment of a fuel door hinge assembly 12 in accordance with the present invention.

Figure 19:
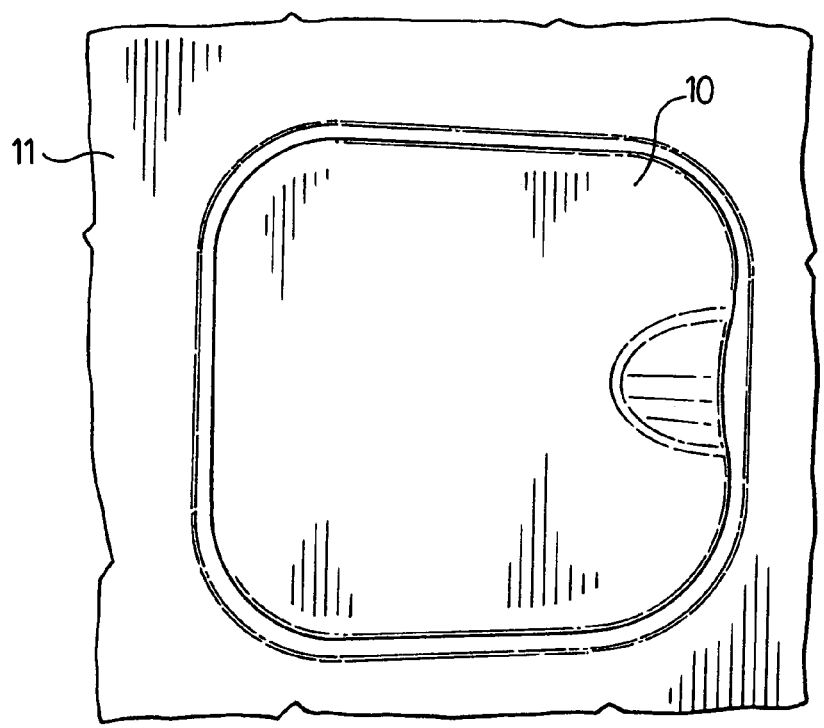
FIG. 19 is an external view of a fuel door in accordance with a third embodiment of the present invention in a closed position relative to a body of a vehicle.
Figure 20:
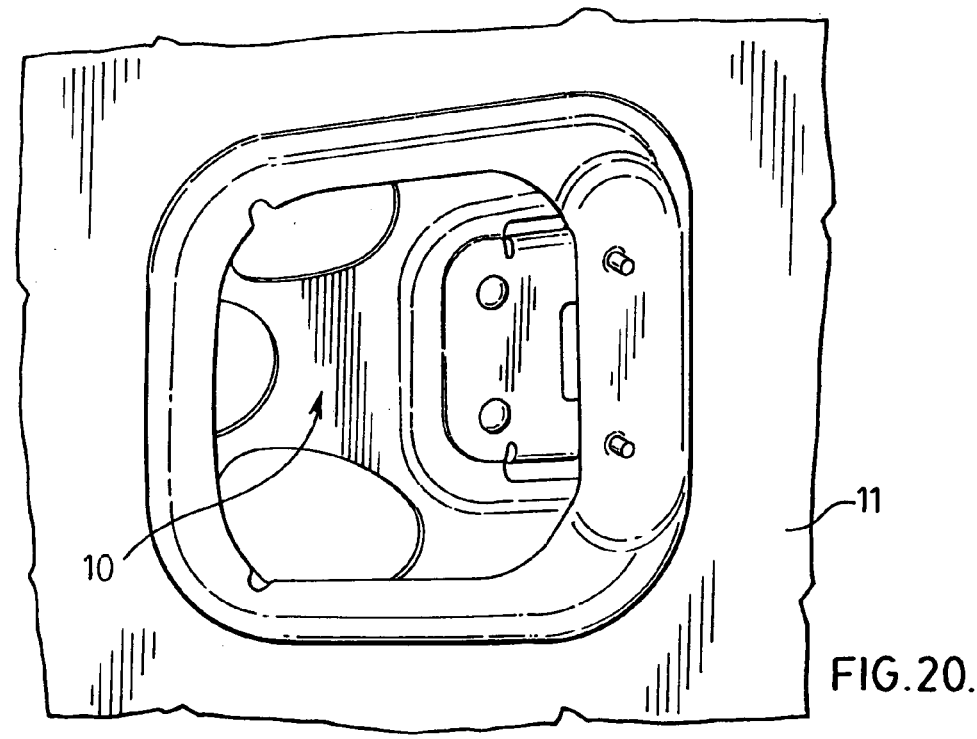
FIG. 20 is an internal view of the fuel door of FIG. 19 in the closed position.
Figure 21:
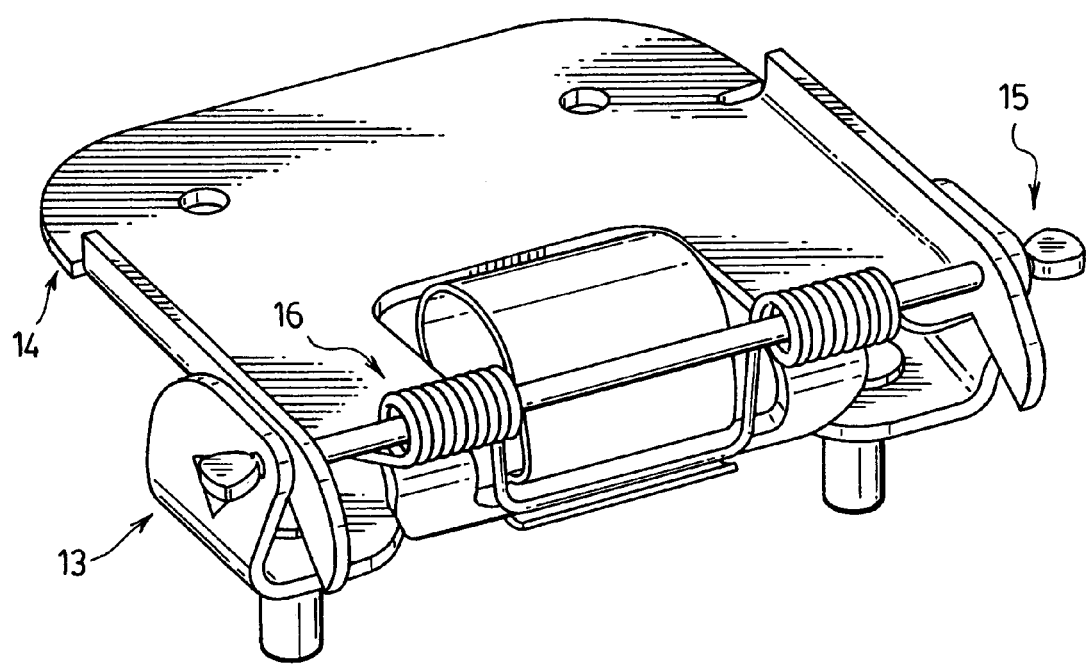
FIG. 21 is an enlarged perspective view of the fuel door hinge assembly shown in FIG. 20.
Figure 22:
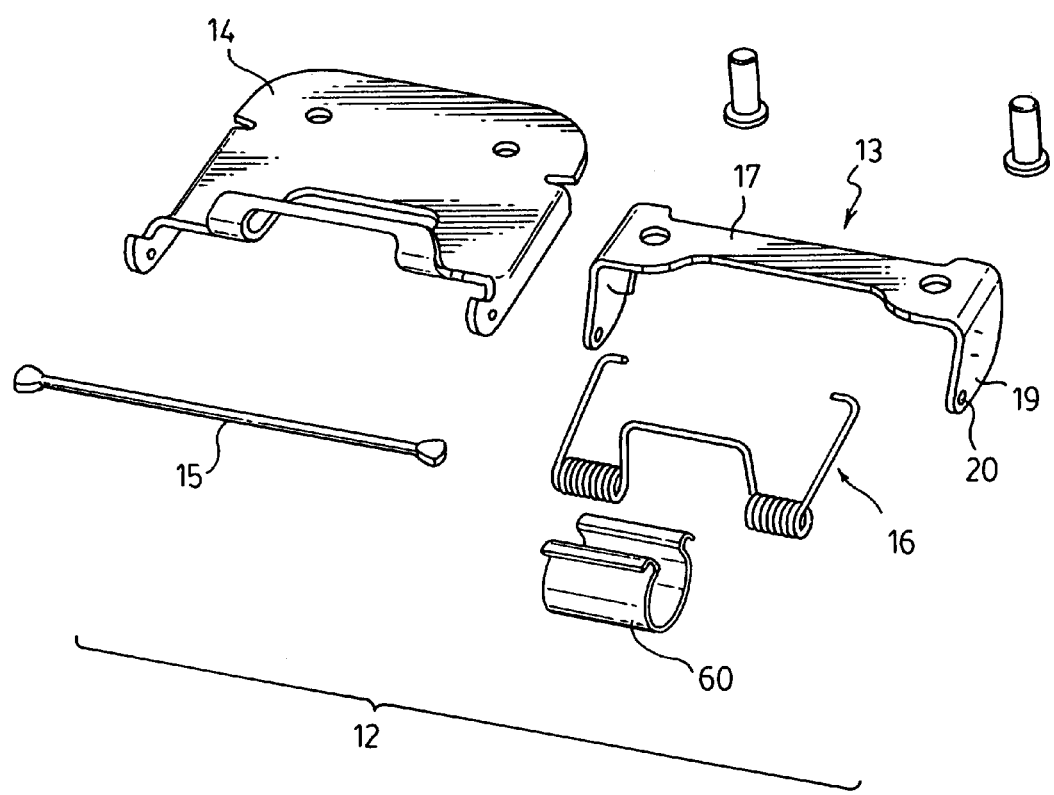
FIG. 22 is a first exploded perspective view of the fuel door hinge assembly of FIG. 21.
Figure 23:
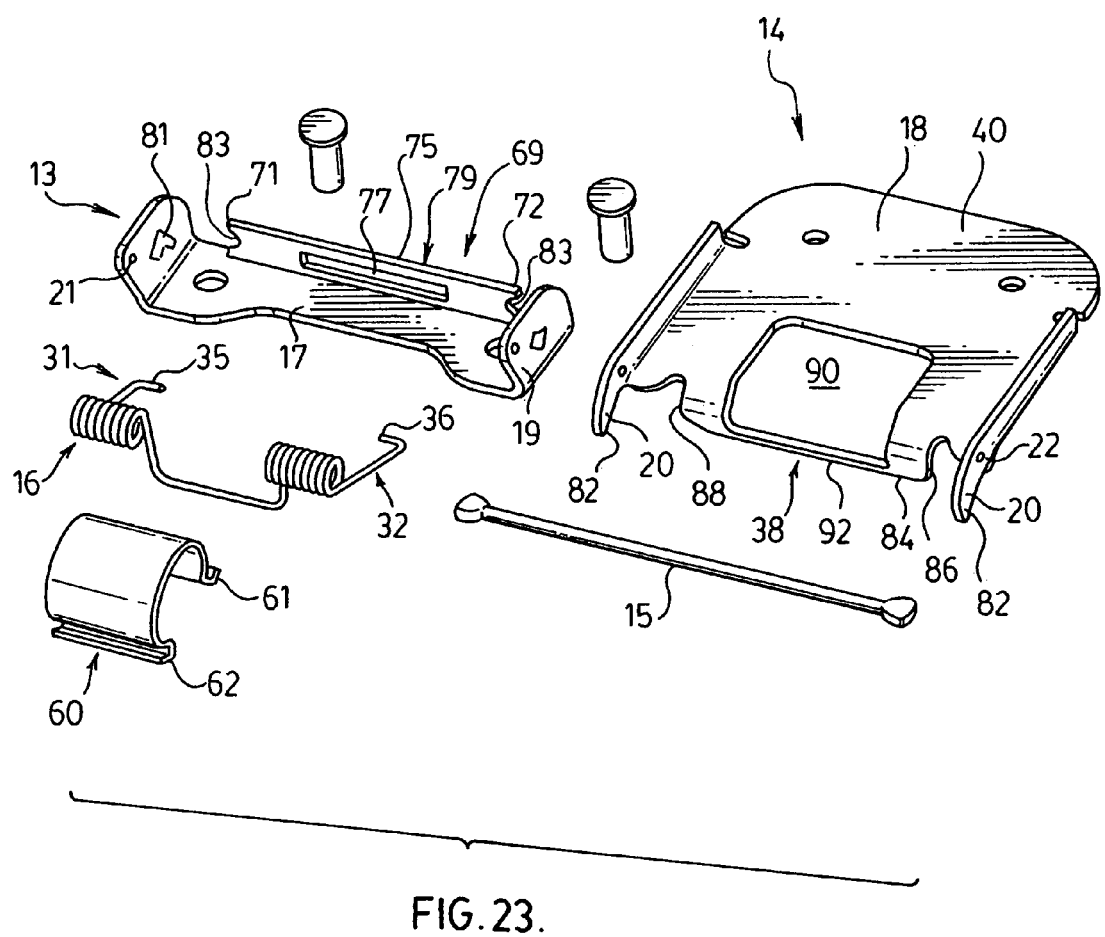
FIG. 23 is a second exploded perspective view of the fuel door hinge assembly of FIG. 21.
Figure 24:
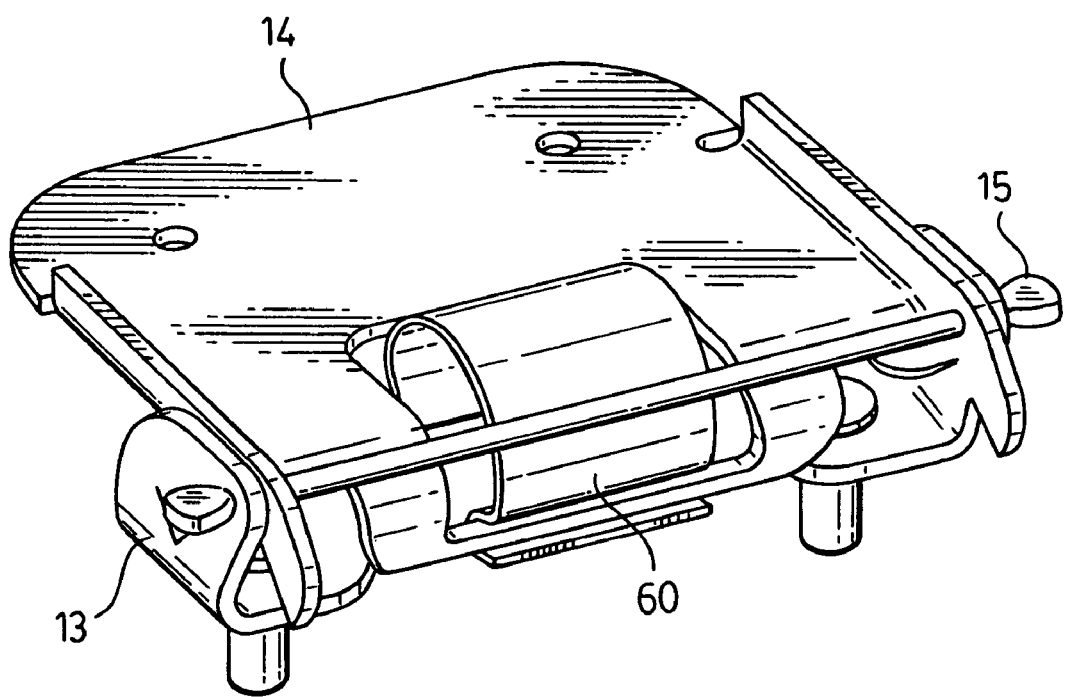
FIG. 24 is a perspective view the same as in FIG. 21 showing the same embodiment but merely with a leaf spring.
Figure 25:
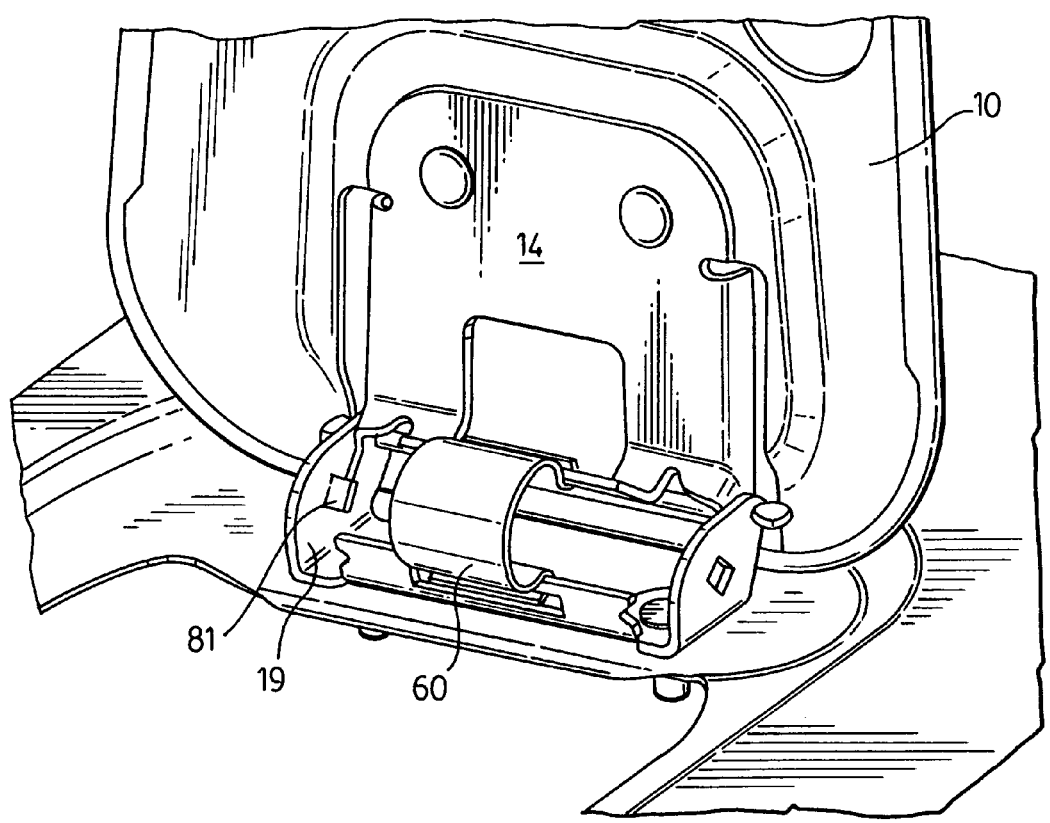
FIG. 25 is a perspective view of a fuel door assembly with a fuel door hinge assembly as shown in FIG. 24 with the door in a fully open position.
Figure 26:
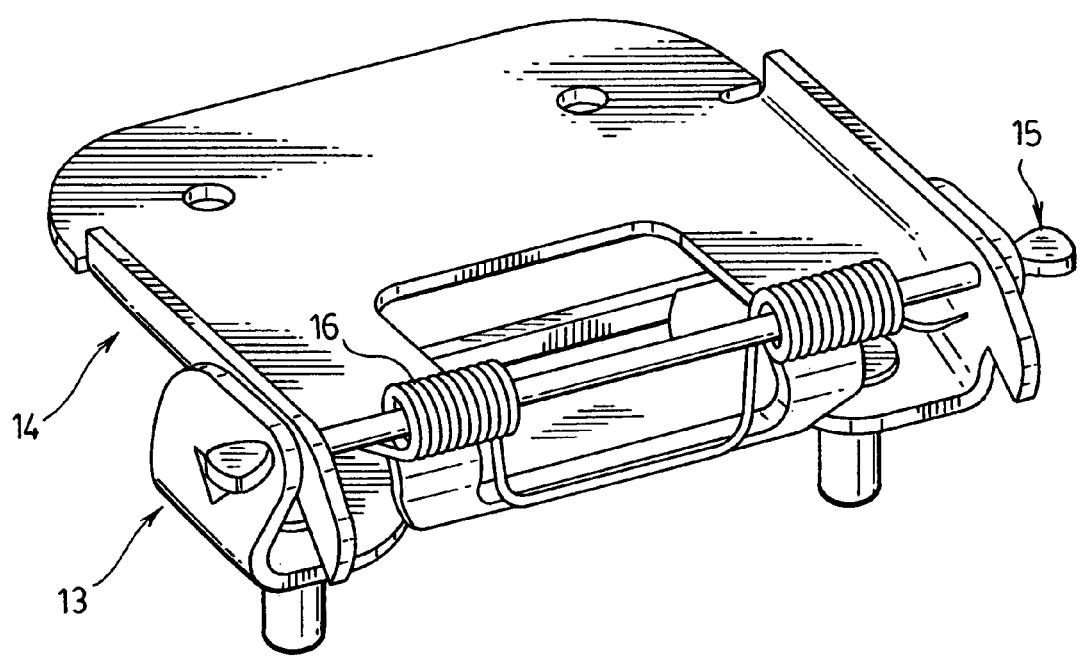
FIG. 26 is a perspective view the same as in FIG. 21 showing the same embodiment but merely with a coil spring.
Figure 27:
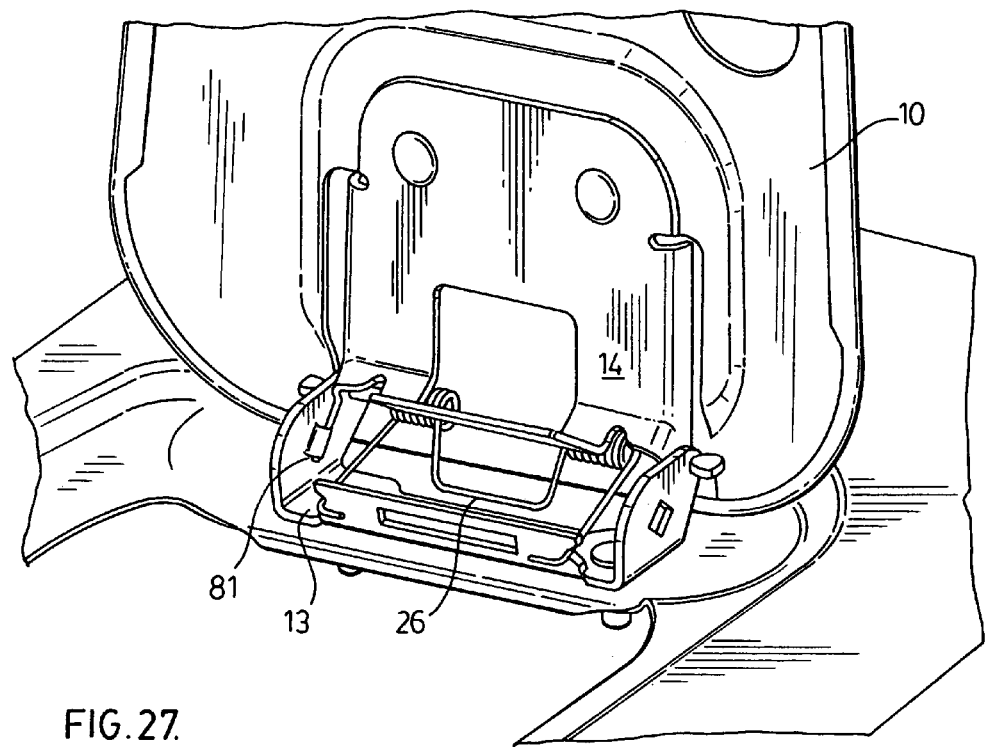
FIG. 27 is a perspective view of a fuel door assembly with a fuel door hinge assembly as shown in FIG. 26 with a door in a fully open position.
Figure 28:
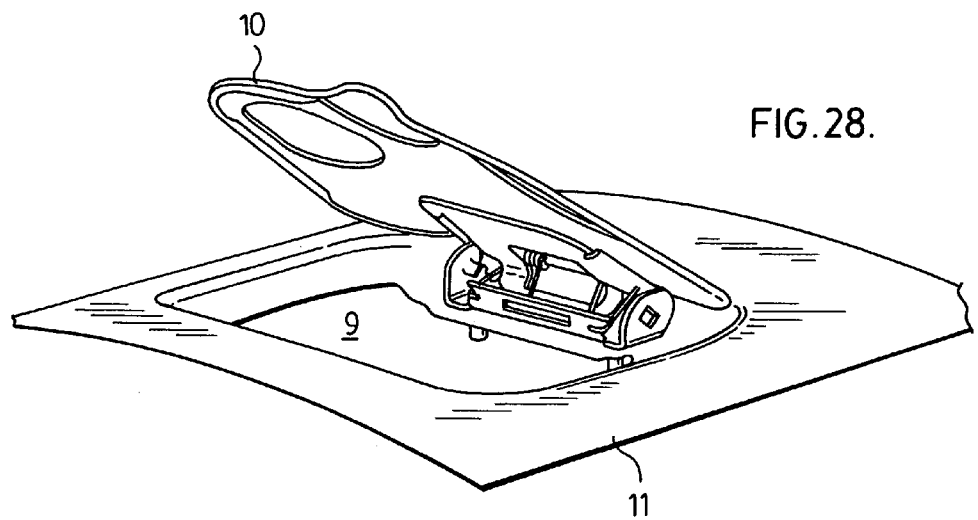
FIG. 28 is a perspective view of a fuel door assembly with a fuel door hinge assembly as shown in FIG. 26 with a door in a 30° open position.

The hinge assembly 12 is adapted for movement from a closed position as shown in FIGS. 19 and 20 to open positions as for example shown in FIGS. 25, 27 and 28. In the embodiment of FIGS. 19 to 27, similar reference numerals are used to illustrate elements which are equivalent to the elements in the embodiments of FIGS. 1 to 18. FIGS. 21 to 23 illustrate the fourth embodiment as a fuel door hinge assembly including a body side hinge bracket 13, a door side hinge bracket 14, an axle member 15, a coil spring member 16 and a leaf spring member 60. The coil spring member 16 is substantially the same as the coil spring member 16 in the other embodiments however the catch arms 31 and 32 are shown to have end portions 35 and 36 which extend axially inwardly.

The body side hinge bracket 13 has a bight portion 17 and side flanges 19 each having a journaling opening 21 to receive the axle member 15. Each side flange 19 is shown as including a stop tab 81 for engagement with end surfaces 82 the side flanges 20 of the door side hinge bracket 14 in a manner as illustrated in FIGS. 25 and 26 to prevent the door side hinge bracket 14 from pivoting relative to the body side hinge bracket 13 passed a fully open position.

The body side hinge bracket 13 includes a central bight tab 69 upstanding from the bight portion 17 between the side flanges 19 and extending from the bight portion 17 in the same direction as the side flanges 19. The bight tab 69 has space lateral side walls 71 and 73 and a second end wall bridge 75 bridging between the side walls 71 and 73. Each side wall 71 and 73 carry a channel 83 which extends inwardly of the side walls 71 and 73 and laterally. Each of the channels 81 is adapted to receive a respective one of the catch arms 31 and 32 of the spring member 16 towards securing the catch arms 31 and 32 to the body side hinge bracket 13 against relative movement. Preferably, the spring member 16, when it has its catch arms 31 and 32 engaged in the channels 81, is tensioned so as to be stressed axially. The bight portion 17 carries two openings adapted to receive bolts or rivets to secure the body side hinge bracket 13 to the body 11.

A central laterally extending elongate second slotway 77 is provided approximate the end wall 75 so as to define between the slotway 77 and the end wall 75 and an elongate second bridge member 79. The second bridge member 79 is adapted to engage the second hook member 62 of the leaf spring 60.

The door side hinge bracket 14 has a bight portion 18 between two side flanges 20 which carry the openings 22 for the axle member 15. The bight portion 18 has a hinge end 38 approximate the axle member 15 and a distal end 40 adapted to be secured to the door 10. The bight portion 18 includes a central bight tab 84 upstanding from the bight portion 18 between the side flanges 20 and extending from the bight portion 18 in the opposite direction as the side flanges 20. The bight tab 82 is space lateral side walls 86 and 88. A central slotway 90 is provided approximate the end wall defining between the slotway 86 and the end wall 38 an elongate second bridge member 92. The second bridge member 92 is adapted to engage the first hook member 61 of the leaf spring 60.

The hinge assembly 12 as illustrated in FIG. 21 is configured to incorporate both the coil spring member 16 and the leaf spring member 60 and to operate in a similar manner to the embodiment illustrated in FIG. 14. The slotway 90 provides an opening, at least in the closed position for the main spring portion 63 of the leaf spring member 60 to extend through the door side hinge bracket 14.

Reference is made to FIG. 24 which illustrates the fourth embodiment similar to that in FIG. 21, however, in which merely the leaf spring member 60 is provided and the coil spring member 16 is not provided. FIG. 25 illustrates the configuration of FIG. 24 in a fully open position in which the leaf spring member 60 biases the door side bracket member 14 to the fully open position in which clockwise rotation is stopped by the side flanges 20 of the door side bracket member 14 engaging the stop tabs 81 on the flange members 19 of the body side hinge bracket member 14.

Reference is made to FIG. 26 which illustrates a configuration of the fourth embodiment in which the coil spring member 16 is provided but the leaf spring member 60 is not provided. FIG. 27 illustrates the configuration of FIG. 26 in a fully open position in which it can be seen that the hoop tab 26 of the spring member 16 is not engaged on the body side bracket member 13. FIG. 28 illustrates an intermediate 30° fully open position to which the coil spring member 16 of the configuration illustrated in FIG. 26 would move the door side bracket member 14 after initial opening as by a remote release hook not shown. In FIG. 28, a finger-pull continues to be provided as to assist in manually moving the door to the fully open position although it would not be necessary when a remote release arrangement is provided.

The preferred embodiments have illustrated the side flanges of the door side hinge bracket being disposed interior of the side flanges of the body side hinge bracket. This is not necessary, and it is to be appreciated that the side flanges of the body side hinge bracket may be disposed inside of the side flanges of the door side hinge bracket in an alternate configuration. Additionally, the preferred embodiments have illustrated the coil spring member as being fixedly secured to the body side hinge bracket against movement. It is to be appreciated that the coil spring member could be securely fixed to the door side hinge bracket against movement.

The coil spring member has been shown to have a pair of coils coaxially about the axle member. In accordance with the preferred embodiments it is preferred that the coil spring member be coiled about the axle member. Merely a single coil or a plurality of coils may be provided.

The elongate axle member is shown as being extending through the openings in the door side hinge bracket and the body side hinge bracket. Preferably, the axle member is a cylindrical rod which may be passed through the bracket members and subsequently having its ends crimped to avoid removal.

The coils of the coil spring member may be coiled closely about the axle member 15 against radial movement relative to the axle member, however, this is not necessary and the coils may be of a diameter substantially greater than the diameter of the axle member with the coil spring member being held relative to the bracket members by being axially compressed by the bracket members and held against rotation relative to one of the bracket members. The coil spring member is preferably fixed on the axle member against axial sliding relative thereto by being compressed or expanded axially on the axle member. Preferably, the coil spring member is compressed or expanded axially by engagement of the catch arms with one of the door hinge bracket and the body side hinge bracket. Alternatively, the coil spring member may be compressed by engagement of the central tap loop with either the door side hinge bracket or the body side hinge bracket. For example, the central tab loop may have its side arms compressed or expanded by engagement with the respective hinge bracket albeit compression or expansion of the tab loop would typically only be appropriate in a configuration in which the coil spring is engaged with the respective bracket throughout a full range of opening of the door from the closed to the fully open position.

While the invention has been described with reference to preferred embodiments, many modifications and variations will now occur to a person skilled in the art. For definition of the invention, references are made to the following claims.

I claim:

1. An automotive fuel door assembly comprising:
   a door side hinge bracket having a bight portion and a pair of spaced parallel side flanges each having a journalling opening therethrough,
   a body side hinge bracket having a bight portion and a pair of spaced parallel side flanges each having a journalling opening therethrough,
   an elongate axle member extending through the journalling openings of the door side hinge bracket member and the journalling openings of the body side hinge bracket member to couple the door side hinge bracket and the body side hinge bracket together for relative pivoting about the axle member with the side flanges of one, interior of the door side hinge bracket and the body side hinge bracket being disposed along the axle member in between the side flanges of the other, exterior of the door side hinge bracket and the body side hinge bracket,
   a first spring member for biasing the door side hinge bracket relative the body side hinge bracket to pivot about the axle member from a closed position toward an open position,
   the first spring member comprising a strand of resilient wire,
   the first spring member having a pair of helical coils coaxially about the axle member axially spaced from each other by a central tab loop of the wire extending radially from the axle member at an interior end of each coil for engagement with the bight of a first of the door side hinge bracket and body side hinge bracket,
   the first spring member having a pair of catch arms each extending radially from an exterior end of a respective one of the coils into engagement with a second of the door side hinge bracket and body side hinge bracket,
   the first spring member fixed on the axle member against axial sliding by being compressed or expanded axially on the axle member by engagement of the catch arms with the second of the door side hinge bracket and the body side hinge bracket,
   the first spring member fixedly coupled by each catch arms with the second of the door side hinge bracket and body side hinge bracket against pivoting movement of the first spring member about the axle member relative the second of the door side hinge bracket and body side hinge bracket,
   the tab loop engaging the bight portion of the first of the door side hinge bracket and body side hinge bracket when the door side hinge bracket and body side hinge bracket are the closed position and in relative pivotal positions from the closed position toward the open position.

2. An automotive fuel door assembly as claimed in claim 1 wherein the tab loop engaging the bight portion of the first of the door side hinge bracket and body side hinge bracket when the door side hinge bracket and body side hinge bracket are in relative pivotal positions between the closed position and an intermediate position between the closed position and the open position and disengaged from the bight portion of the first of the door side hinge bracket and body side hinge bracket when the door side hinge bracket and body side hinge bracket are in relative pivotal positions between the intermediate position and the open position.

3. An automotive fuel door assembly as claimed in claim 2 wherein when the door side hinge bracket and body side hinge bracket are in the intermediate position the spring member assumes an unbiased condition in which the tab loop is disposed at a fixed angle relative to the catch arms about the axle member, and in moving the door side hinge bracket relative to the body side hinge bracket toward the closed position the first spring member is increasingly compressed with the tab loop being disposed at increasingly changing angle from the fixed angle.

4. An automotive fuel door assembly as claimed in claim 2 wherein the first spring member is compressed axially between the side flanges of the second of the door side hinge bracket and the body side hinge bracket.

5. An automotive fuel door assembly as claimed in claim 1 wherein the bight portion of the first of the door side hinge bracket and body side hinge bracket includes a central slot to receive and engage the tab loop.

6. An automotive fuel door assembly as claimed in claim 2 wherein the bight portion of the second of the door side hinge bracket and body side hinge bracket includes a central second bight tab upstanding from its bight portion between its side flanges and extending from its bight portion in the same direction as its side flanges.

7. An automotive fuel door assembly as claimed in claim 6 wherein the bight portion of the second of the door side hinge bracket and body side hinge bracket has a first surface for securing to a respective door or automotive body, and a second surface, with the second bight tab and side flanges extending from the bight portion away from the first surface, the second bight tab having spaced lateral sidewalls.

8. An automotive fuel door assembly as claimed in claim 7, wherein the spaced lateral side walls of the second bight tab are engaged by the catch arms of the first spring member.

9. An automotive fuel door assembly as claimed in claim 8 wherein the second bight tab further includes on each side wall a laterally inwardly extending channel to receive a respective one of the catch arms.

10. An automotive fuel door assembly as claimed in claim 7 wherein the second bight tab further includes a tab end wall bridging between its spaced lateral side walls,
   a central laterally extending elongate second slotway adjacent the tab end wall defining between the second slotway and the tab end wall an elongate second bridge member.

11. An automotive fuel door assembly as claimed in claim 6 wherein the bight portion of the first of the door side hinge bracket and body side hinge bracket has a first surface for securing to a respective door or automotive body, and a second surface, with its side flanges extending from the bight portion away from the second surface.

12. An automotive fuel door assembly as claimed in claim 10 wherein the bight portion of the first of the door side hinge bracket and body side hinge bracket includes a bight end wall at an end of the bight portion proximate the axle member, a central laterally extending elongate first slotway adjacent the bight end wall defining between the slotway and the bight end wall an elongate first bridge member.

13. An automotive fuel door assembly as claimed in claim 12 including an elongate leaf spring having an omega shape in side view with a smaller curved end hook member at each end between a central large curved main spring portion between two smaller first and second curved end hook members at each end,
   the second end hook member engaged about the second bridge member,
   the first end hook member engaged about the first bridge member,
   when the door side hinge bracket and body side hinge bracket are in the closed position the main spring portion of the leaf spring extending away from the first bridge member and the second bridge member via the first slotway,
   when the door side hinge bracket and body side hinge bracket are in relative pivotal positions between the open position and a medial position between the closed position and the open position, the leaf spring biasing them towards the open position.

14. An automotive fuel door assembly as claimed in claim 13 when the door side hinge bracket and body side hinge bracket are in relative pivotal positions between the closed position and the medial position, the leaf spring biasing them towards the closed position, and when the door side hinge bracket and body side hinge bracket are in relative pivotal positions between the medial position and the open position the leaf spring biasing them towards the open position.

15. An automotive fuel door assembly as claimed in claim 1 wherein each of the coils coiled closely about the axle member against radial movement relative the axle member.

16. An automotive fuel door assembly as claimed in claim 1
   wherein the bight portion of the body side hinge bracket substantially lies in a flat plane,
   the door side hinge bracket is a goose-neck configuration such that in a closed position the bight portion of the door side hinge bracket extends from a hinged end journalled to the axle member inwardly substantially normal to the bight portion of the body side hinge bracket then curving outwardly to present a door attachment portion at distal end of the bight portion of the door side hinge bracket substantially in the same plane as the bight portion of the door side hinge bracket.

17. An automotive fuel door assembly as claimed in claim 12 wherein the bight portion of the body side hinge bracket substantially lies in a flat plane,
   the door side hinge bracket is a goose-neck configuration such that in a closed position the bight portion of the door side hinge bracket extends from a hinged end journalled to the axle member inwardly substantially normal to the bight portion of the body side hinge bracket then curving outwardly to present a door attachment portion at distal end of the bight portion of the door side hinge bracket substantially in the same plane as the bight portion of the door side hinge bracket,
   an elongate leaf spring having an omega shape in side view with a smaller curved end hook member at each end between a central large curved main spring portion between two smaller first and second curved end hook members at each end,
   the second end hook member engaged about the second bridge member,
   the first end hook member engaged about the first bridge member,
   the main spring portion of the leaf spring extending away from the body side hinge bracket where the second end hook member is engaged about the second bridge member to over the first bridge member and then through the first slotway to its first end hook member engaged about the first bridge member,
   when the door side hinge bracket and body side hinge bracket are in relative pivotal positions of the intermediate position or between the intermediate position and the open position the leaf spring biasing them towards the open position.

18. An automotive fuel door assembly comprising:
   a door side hinge bracket having a bight portion and a pair of spaced parallel side flanges each having a journalling opening therethrough,
   a body side hinge bracket having a bight portion and a pair of spaced parallel side flanges each having a journalling opening therethrough,
   an elongate axle member extending through the journalling openings of the door side hinge bracket member and the journalling openings of the body side hinge bracket member to couple the door side hinge bracket and the body side hinge bracket together for relative pivoting about the axle member with the side flanges of one, interior of the door side hinge bracket and the body side hinge bracket being disposed along the axle member in between the side flanges of the other, exterior of the door side hinge bracket and the body side hinge bracket, the bight portion of the second of the door side hinge bracket and body side hinge bracket includes a central second bight tab upstanding from the bight portion between its side flanges and extending from the bight portion in the same direction as its side flanges, the bight portion of the second of the door side hinge bracket and body side hinge bracket has a first surface for securing to a respective door or automotive body, and a second surface, with the second bight tab and side flanges extending from the bight portion away from the first surface, the second bight tab having spaced lateral side walls, the second bight tab further including a tab end wall bridging between the side walls, a central laterally extending elongate second slotway adjacent the tab end wall defining between the slotway and the tab end wall an elongate second bridge member, the bight portion of the first of the door side hinge bracket and body side hinge bracket including a bight end wall at an end of the bight portion proximate the axle member, a central laterally extending elongate first slotway adjacent the bight end wall defining between the first slotway and the bight end wall an elongate first bridge member, the bight portion of the first of the door side hinge bracket and body side hinge bracket includes a central first bight tab upstanding from the bight portion between its side flanges and extending from the bight portion in the opposite direction as its side flanges, a biasing mechanism for biasing the door side hinge bracket relative the body side hinge bracket to pivot about the axle member, the biasing member selected from the group consisting of a first spring member and a second spring member, the first spring member adapted for biasing the door side hinge bracket relative the body side hinge bracket to pivot about the axle member from a closed position toward an open position, the first spring member comprising a strand of resilient wire, the first spring member having a pair of helical coils to be received coaxially about the axle member axially spaced from each other by a central tab loop of the wire extending radially from the axle member at an interior end of each coil for engagement with the bight of a first of the door side hinge bracket and body side hinge bracket, the first spring member having a pair of catch arms each adapted to extend radially from an exterior end of a respective one of the coils into engagement with the second of the door side hinge bracket and body side hinge bracket, the first spring member adapted to be fixed on the axle member against axial sliding by being compressed or expanded axially on the axle member by engagement of the catch arms with the second of the door side hinge bracket and the body side hinge and/or by engagement of the central tab loop with the first of the door side hinge bracket and the body side hinge bracket, the first spring member adapted to be fixedly coupled by each catch arms with the second of the door side hinge bracket and body side hinge bracket against pivoting movement of the first spring member about the axle member relative the second of the door side hinge bracket and body side hinge bracket, the tab loop adapted to engage the bight portion of the first of the door side hinge bracket and body side hinge bracket when the door side hinge bracket and body side hinge bracket are the closed position and in relative pivotal positions from the closed position toward the open position, the second spring member comprising an elongate leaf spring having an omega shape in side view with a smaller curved end hook member at each end between a central large curved main spring portion between two smaller first and second curved end hook members at each end, the second end hook member adapted to engage about the second bridge member and the first end hook member adapted to engage about the first bridge member such that when the door side hinge bracket and body side hinge bracket are in the closed position the main spring portion of the leaf spring extends away from the first bridge member and the second bridge member via the first slotway and when the door side hinge bracket and body side hinge bracket are in relative pivotal positions between the open position and a medial position between the open position and the closed position the leaf spring biasing them towards the closed position, and when the door side hinge bracket and body side hinge bracket are in relative pivotal positions between the medial position and the open position the leaf spring biasing them towards the open position.

19. An automotive fuel door assembly as claimed in claim 18 wherein the tab loop adapted to engage the bight portion of the first of the door side hinge bracket and body side hinge bracket when the door side hinge bracket and body side hinge bracket are in relative pivotal positions between the closed position and an intermediate position between the closed position and the open position and to disengage from the bight portion of a first of the door side hinge bracket and body side hinge bracket when the door side hinge bracket and body side hinge bracket are in relative pivotal positions between the intermediate position and the open position.

20. An automotive fuel door assembly comprising:
a door side hinge bracket having a bight portion and a pair of spaced parallel side flanges each having a journalling opening therethrough, a body side hinge bracket having a bight portion and a pair of spaced parallel side flanges each having a journalling opening therethrough, an elongate axle member extending through the journalling openings of the door side hinge bracket member and the journalling openings of the body side hinge bracket member to couple the door side hinge bracket and the body side hinge bracket together for relative pivoting about the axle member with the side flanges of one, interior of the door side hinge bracket and the body side hinge bracket being disposed along the axle member in between the side flanges of the other, exterior of the door side hinge bracket and the body side hinge bracket, a first spring member for biasing the door side hinge bracket relative the body side hinge bracket to pivot about the axle member from a closed position toward an open position, the first spring member comprising a strand of resilient wire, the first spring member having a pair of helical coils coaxially about the axle member axially spaced from each other and a central tab loop of the wire joining the coils and extending radially from the axle member at a first end of each coil for engagement with the bight of a first of the door side hinge bracket and body side hinge bracket, the first spring member having a pair of catch arms each extending radially from a second end of a respective one of the coils into engagement with a second of the door side hinge bracket and body side hinge bracket, the first spring member fixed on the axle member against axial sliding by being compressed or expanded axially on the axle member by engagement of the first spring member with the door side hinge bracket or the body side hinge bracket, the first spring member fixedly coupled by each catch arms with the second of the door side hinge bracket and body side hinge bracket against pivoting movement of the first spring member about the axle member relative the second of the door side hinge bracket and body side hinge bracket, the tab loop engaging the bight portion of the first of the door side hinge bracket and body side hinge bracket when the door side hinge bracket and body side hinge bracket are the closed position and in relative pivotal positions from the closed position toward the open position.

* * * * *